(12) United States Patent
Valli et al.

(10) Patent No.: US 12,113,949 B2
(45) Date of Patent: Oct. 8, 2024

(54) SYSTEM AND METHOD FOR DEPTH DATA CODING

(71) Applicant: Rovi Guides, Inc., San Jose, CA (US)

(72) Inventors: Seppo Valli, Espoo (FI); Pekka Siltanen, Helsinki (FI)

(73) Assignee: Rovi Guides, Inc., San Jose, CA (US)

( * ) Notice: Subject to any disclaimer, the term of this patent is extended or adjusted under 35 U.S.C. 154(b) by 60 days.

(21) Appl. No.: 18/088,207

(22) Filed: Dec. 23, 2022

(65) Prior Publication Data

US 2024/0214539 A1  Jun. 27, 2024

(51) Int. Cl.
*H04N 13/282* (2018.01)
*H04N 13/128* (2018.01)
*H04N 13/161* (2018.01)
*H04N 13/194* (2018.01)
*H04N 19/597* (2014.01)

(52) U.S. Cl.
CPC ......... *H04N 13/161* (2018.05); *H04N 13/128* (2018.05); *H04N 13/194* (2018.05); *H04N 19/597* (2014.11)

(58) Field of Classification Search
CPC .. H04N 13/161; H04N 19/597; H04N 13/128; H04N 13/194
See application file for complete search history.

(56) References Cited

U.S. PATENT DOCUMENTS

| | | | | |
|---|---|---|---|---|
| 2010/0310155 | A1* | 12/2010 | Newton | H04N 19/597 348/E13.001 |
| 2011/0188773 | A1* | 8/2011 | Wei | G06T 5/70 382/260 |
| 2012/0287233 | A1* | 11/2012 | Wang | H04N 13/128 348/42 |
| 2014/0362195 | A1* | 12/2014 | Ng-Thow-Hing | G06V 40/20 348/51 |
| 2019/0043257 | A1* | 2/2019 | Kirk | H04N 19/00 |
| 2019/0295293 | A1* | 9/2019 | Kirk | H04N 19/597 |

(Continued)

FOREIGN PATENT DOCUMENTS

WO    2019183211 A1    9/2019

OTHER PUBLICATIONS

Akeley et al., "A Stereo Display Prototype with Multiple Focal Distances," Stanford University, pp. 804-813 (2004).

(Continued)

*Primary Examiner* — Jonathan R Messmore
(74) *Attorney, Agent, or Firm* — Haley Guiliano LLP

(57) ABSTRACT

Systems and methods for encoding/decoding a 3D image are provided. The system decomposes depth map into a plurality of component depth maps (CDMs) for a plurality of depth ranges, wherein each component depth map corresponds to a focal plane of a multiple focal plane (MFP) decomposition of the image data. The system generates a plurality of component depth map focal planes (CDMFPs) by combining each respective CDM with the depth map. The system scales data in each CDMFP by a respective scaling factor. The system generates for transmission a plurality of encoded scaled CDMFP data streams for the plurality of depth ranges, wherein each respective scaled CDMFP data stream is based at least in part on a respective scaled CDMFP.

20 Claims, 16 Drawing Sheets

(56) References Cited

U.S. PATENT DOCUMENTS

2021/0133994 A1    5/2021    Valli et al.
2023/0362409 A1    11/2023    Chupeau et al.

OTHER PUBLICATIONS

Chan et al., "Overview of current development in depth map coding of 3D video and its future," IET Signal Processing, 14(1): 1-14 (2020).

Debono et al., "Efficient Depth-Based Coding," Department of Communications and Computer Engineering, University of Malta, pp. 97-114 (2019).

Kela et al., "Flexible Backhauling with Massive MIMO for Ultra-Dense Networks," IEEE Access, 4:9625-9634 (2016).

Ogniewski et al., "What is the best depth-map compression for Depth Image Based Rendering?" Computer Analysis of Images and Patterns: 17th International Conference, CAIP 2017, pp. 403-415 (2017).

Valli et al., "Advances in Spatially Faithful (3D) Telepresence," IntechOpen, pp. 1-24 (2021).

\* cited by examiner

302
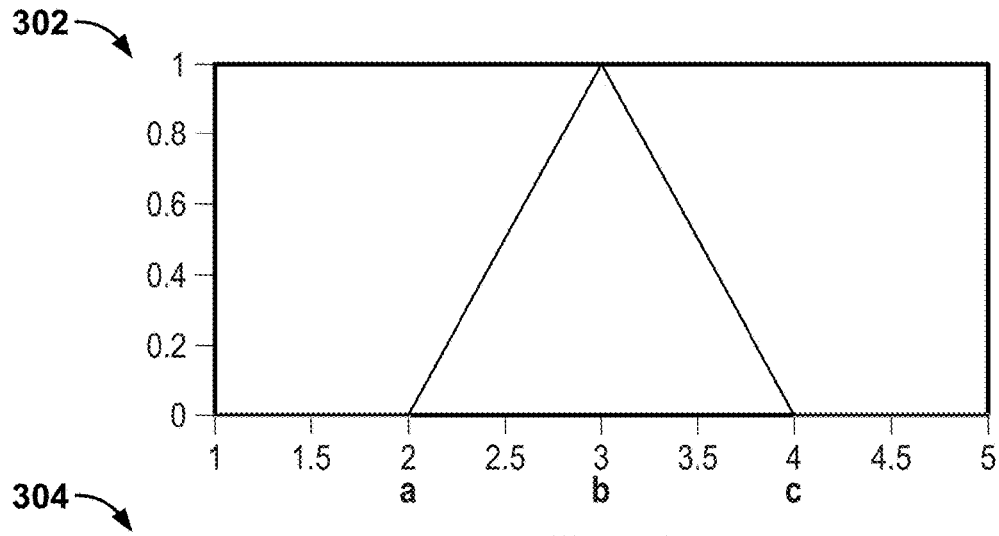
FIG. 3A
304
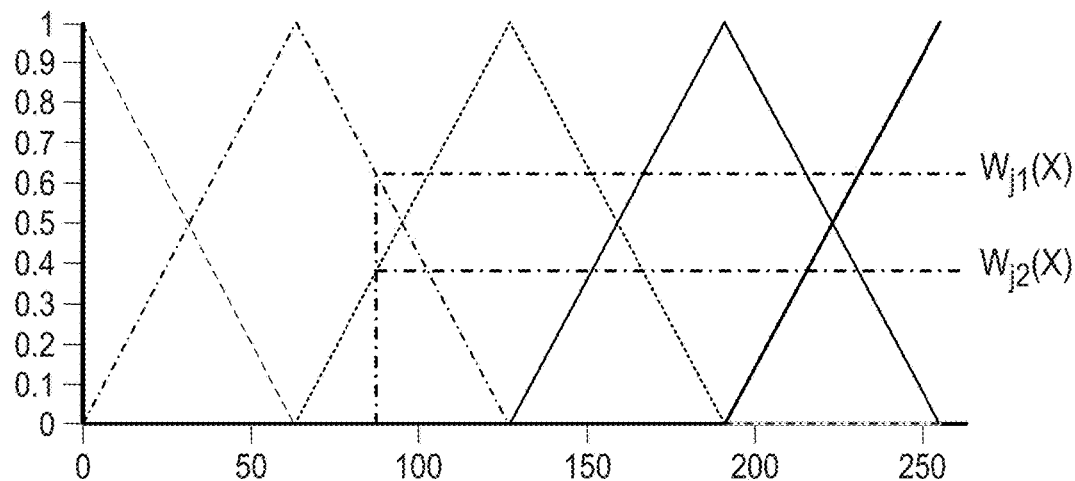
FIG. 3B
306
$$W_i(x, a_i, b_i, c_i) = \begin{cases} (x - a_i)/(b_i - a_i), & a_i \leq x < b_i \\ (c_i - x)/(c_i - b_i), & b_i \leq x < c_i \\ 0, & x \leq a_i \text{ or } x \geq c_i \end{cases}$$
FIG. 3C
308
$d(x,y) = c_{j1} - (c_{j1} - b_{j1}) * w_{j1}(x,y)$, where $j1$ = smallest $i$ where $w_i(x,y) > 0$
$d(x,y) = a_{j2} + (b_{j2} - a_{j2}) * w_{j2}(x,y)$, where $j2$ = largest $i$ where $w_i(x,y) > 0$
FIG. 3D

402

| d(in) | 0 | 1 | 0 | 1 | 0 | 1 | 0 | 1 | 0 | 1 | 682 |
|---|---|---|---|---|---|---|---|---|---|---|---|

Step 1: Rounding 10 bits/pixel value

| | 0 | 0 | 1 | 1 | 0 | 1 | 0 | 1 | 0 | 1 | 684 |
|---|---|---|---|---|---|---|---|---|---|---|---|

Step 2: Transforming 10 bits/pixel to 8 bit/pixel

| | | | 1 | 1 | 0 | 1 | 0 | 1 | 0 | 1 | 171 |
|---|---|---|---|---|---|---|---|---|---|---|---|

Step 3: Coding, transmission and decoding by 8 bits (with coding error)

| | | | 0 | 1 | 0 | 1 | 0 | 1 | 0 | 1 | 170 |
|---|---|---|---|---|---|---|---|---|---|---|---|

Step 4: Transforming to 10 bits

| d'(out) | 0 | 0 | 0 | 1 | 0 | 1 | 0 | 1 | 0 | 1 | 680 |
|---|---|---|---|---|---|---|---|---|---|---|---| a) Coding directly with limited quality

| d(in) | 0 | 1 | 0 | 1 | 0 | 1 | 0 | 1 | 0 | 1 | 682 |
|---|---|---|---|---|---|---|---|---|---|---|---|

Step 1: Depth blending with full accuracy (here two components)

| | 0 | 1 | 0 | 1 | 0 | 1 | 0 | 1 | 0 | 1 | 682 |
|---|---|---|---|---|---|---|---|---|---|---|---|
| | 0 | 0 | 0 | 0 | 1 | 0 | 1 | 0 | 1 | 0 | 341 |

Step 2: Rounding 10 bits values

| | 0 | 0 | 1 | 1 | 0 | 1 | 0 | 1 | 0 | 1 | 684 |
|---|---|---|---|---|---|---|---|---|---|---|---|
| | 0 | 0 | 0 | 0 | 1 | 0 | 1 | 0 | 1 | 0 | 341 |

Step 3: Transforming 10 bits/pixel to 8 bits/pixel

| | | | 1 | 1 | 0 | 1 | 0 | 1 | 0 | 1 | 171 |
|---|---|---|---|---|---|---|---|---|---|---|---|
| | | | 0 | 0 | 1 | 0 | 1 | 0 | 1 | 0 | 84 |

Step 4: Coding, transmission and decoding by 8 bits (with coding error in first component)

| | | | 0 | 1 | 0 | 1 | 0 | 1 | 0 | 1 | 170 |
|---|---|---|---|---|---|---|---|---|---|---|---|
| | | | 0 | 0 | 1 | 0 | 1 | 0 | 1 | 0 | 84 |

Step 5: Recomposition (inverse blending) with full accuracy

| | 0 | 0 | 0 | 1 | 0 | 1 | 0 | 1 | 0 | 1 | 684 |
|---|---|---|---|---|---|---|---|---|---|---|---|
| | 0 | 0 | 0 | 1 | 0 | 1 | 0 | 1 | 0 | 1 | 680 |

Step 6: Averaging the components

| d'(out) | 0 | 1 | 0 | 1 | 0 | 1 | 0 | 1 | 0 | 1 | 682 |
|---|---|---|---|---|---|---|---|---|---|---|---| b) Coding blended components with limited quality => increased quality compared to direct coding

SYSTEM AND METHOD FOR DEPTH DATA CODING

BACKGROUND

This disclosure is generally directed to techniques for encoding depth data of an image. In particular, some of the data that may be used to form multiple focal planes may be used to improve coding of depth data of a 3D image (e.g., for network transmission).

SUMMARY 3D displays have been more frequently used in virtual and extended reality applications to display three-dimensional visuals to a user through use of display screens that are displayed to the eyes of a user. However, transmitting data to form such 3D images is a complex undertaking.

In one approach, a depth-blending algorithm is used to generate component depth maps (CDMs) corresponding to multiple focal planes (MFPs) that may be displayed simultaneously e.g., using a stack of transparent displays and/or using spatial light modulators (SLMs) that are capable of rendering image content to varying distances, controlled by tailored phase functions. As will be explained in more detail, in addition to being useful for creating an improved 3D image, MFP decomposition may be used to improved data coding and transmission (even for cases where MFPs are not used to generate a display of a 3D image).

The term "spatial light modulator" ("SLM") device refers to any suitable programmable pixel-by-pixel spatial light modulator device or any other suitable opto-electronic device or device component capable of locally directing and focusing light to different depths. In some embodiments, an SLM device works by directing light pixel by pixel, however other less precise SLM device may also be used. In some embodiments, an SLM device may also refer to a grid of parallel SLMs, or a series of SLMs rendering content in successive steps.

For example, to achieve depth-blending of any set of voxels (e.g., a set of voxels of a frame of 3D media content), the voxels may be rendered at set different distances to create blended pixels at any depth. The term "voxel" refers to any suitable unit of graphic information that defines a point in three-dimensional space. If a voxel of the frame happens to be mapped exactly to a focal plane, then voxel representation is displayed by lighting up a single location at a single distance. If a voxel of the frame does not map exactly to a focal plane, the rendering system will render such a voxel as a blended pixel using a plurality of closest display planes (e.g., two closest display panels). Example linear blending function are described, e.g., in K. Akeley, et al., "a stereo display prototype with multiple focal distances," CM Trans. Graph. 23, 3, 804-813, 2004 which is incorporated herein, in its entirety. When viewed together the two blended pixels create a perception representation for the voxel of the 3D media content. In one approach, an MFP display may use spatial light modulator (SLM) to locally adjust the focus to follow the depth of the virtual objects. In this approach, the rendering system generates a phase function for each individual pixel based on its depth value. The SLM uses phase functions to shift each displayed pixel to its target focal plane/distance.

In one approach the depth-blending algorithm, starting with depth data and texture data of an image, generates component depth maps (CDMs) that may be used to create the MFPs (e.g., by multiplying texture data of an image by the respective CDM). The individual CDMs are coded separately (e.g., using a variety of intra and inter coding techniques) and are transmitted in synchronized manner (e.g., in a container file, or sequentially but with markings that allow them to be re-synchronized). The encoded texture of an image is also sent synchronously with the CDMs. The receiver decodes the CDMs and reconstructs the depth data. In particular, a reversible depth-blending function with a partition of unity property may be used to enable such a reconstruction.

The receiver may also decode the texture and synchronize it with the received depth data. Once the receiver is in possession of both texture and depth data of the image, the receiver may display the 3D image in any suitable fashion (e.g., using SLM device or any other suitable 3D display).

Such approaches enable coding of high dynamic range (HDR) depth map sequences with lower dynamic range coding methods. In some embodiments, such coding approach may be used as an add-on procedure, which can be used to increase the dynamic range and coding quality of almost any underlying suitable coding method. The approach can increase the efficiency of coding HDR depth data.

In some embodiments, by increasing the number of formed components (CDMs), overall coding accuracy can be increased despite each of the components being coded with a limited accuracy, e.g., due to the coding method and its pixel depth (bits/pixel). Another advantage of this coding approach is its increased support for HDR depth data. The approach can be applied for the coding and streaming of RGBD (Red, Green, Blue, Depth) data (or in place of RGB, color image data in any suitable color format e.g., YCbCr) and to high resolution and dynamics data provided by LIDAR (Light Detection and Ranging) sensors. While enabling higher quality with simpler coding methods, the approach has lower computational complexity than other coding methods.

The disclosed coding approach may be applied to coding image data for multiple suitable applications. For example, high quality depth may be an important component of the video plus depth format (V+D), which—in addition to stereoscopic or accommodative perception—is able to support synthesizing viewpoints for emerging 3 DoF (degrees of freedom), 3 DoF+, and 6 DoF services (e.g., provided by free viewpoint video (FVV)).

In another approach, the system may code CDMFPs (Component Depth Map Focal Planes), which may be generated by multiplying each CDM by the initial depth map of the image. One advantage of using CDMFPs is that there is no need for a reversible depth blending function. Instead, CDMFPs may be summed to recover the depth data. However, CDMFPs may show low contrast and thus be difficult to encode (compress). To help address this problem, each CDMFP may be scaled before transmission to cover the full dynamic range. The receiver may receive the scaling factor and de-scale the scaled CDMFPs before using the CDMFPs to recover the depth data.

As mentioned above scaled CDMFPs (SCDMFPs) and CDMs may be encoded individually. This allows for further improvement of the encoding and transmission by allocating more bits to CDMs/SCDMFPs that correspond to key depth range(s) (e.g., a depth range that contains depicted objects as opposed to, for example, background). For example, in live transmissions CDMs/SCDMFPs may be coded with less compression in key ranges and with more compression in other ranges. In another example approach, CDMs/SCDMFPs may be pre-coded in a variety of qualities, and the transmission system may dynamically decide which quality of encoded CDMs/SCDMFPs data may be sent for each depth range (e.g., based on client request).

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3A depicts an example of depth blending techniques, in accordance with some embodiments of this disclosure;

FIG. 3B depicts another example of depth blending techniques, in accordance with some embodiments of this disclosure;

FIG. 3C depicts yet another example of depth blending techniques, in accordance with some embodiments of this disclosure;

FIG. 3D depicts an example of reversing depth blending, in accordance with some embodiments of this disclosure;

FIG. 4 depicts an example of depth data coding, in accordance with some embodiments of this disclosure;

DETAILED DESCRIPTION

Figure 1A:
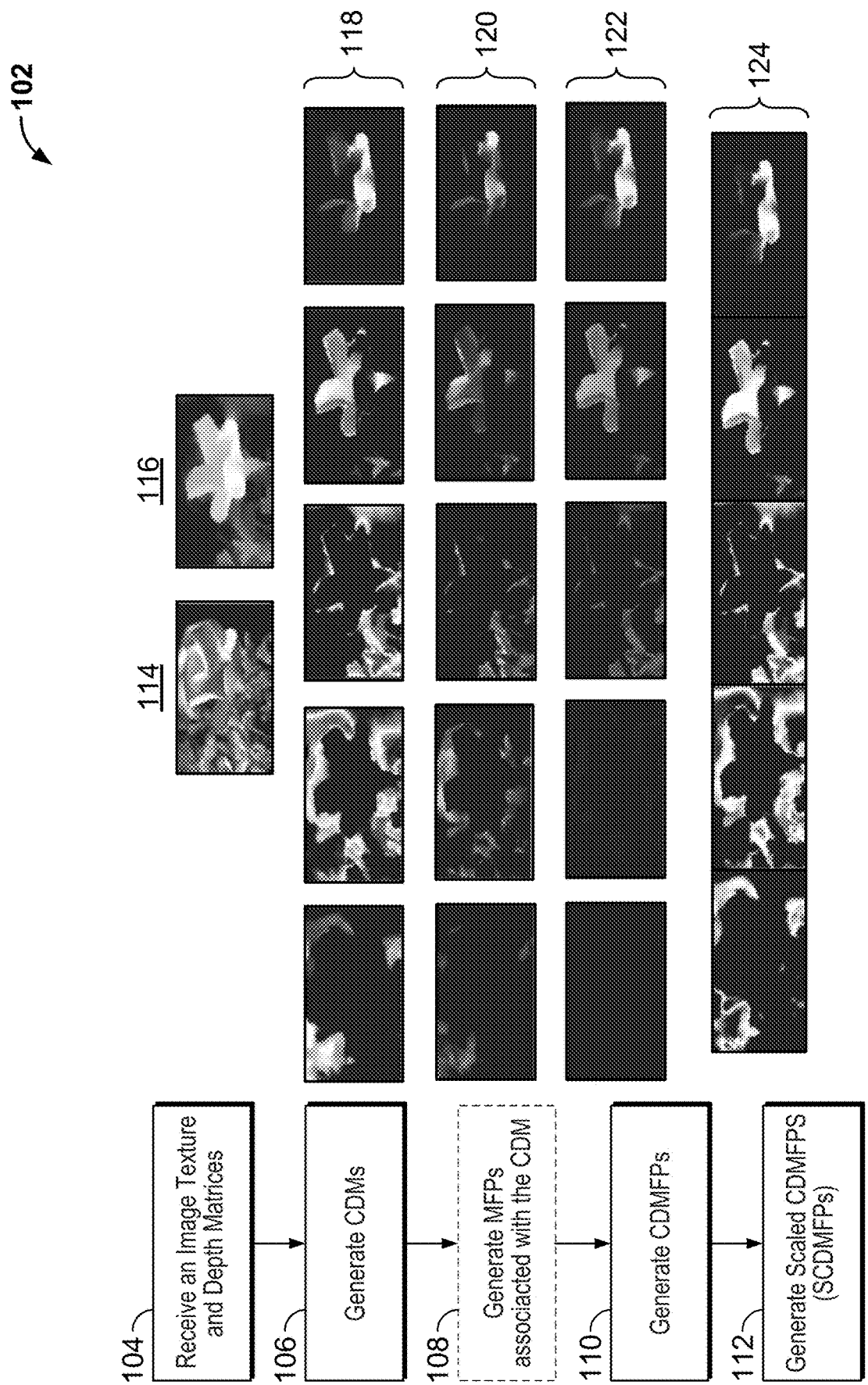
FIG. 1A depicts an example method for decomposing a 3D image, in accordance with some embodiments of this disclosure.

FIG. 1A depicts an example method 104 for decomposing a 3D image, in accordance with some embodiments of this disclosure.

At step 104, image processing application of a rendering system receives image data. For example, image data may comprise a frame of a video (e.g., 3D video) or other media content (e.g., 3D video game, 3D video conference, etc.). In another example, image data may be received from a camera or a sensor. In some embodiments, image data may include a texture of an image 114 and depth data 116 (depth map) for the image data. For example, the texture data may be a table comprising luminance and/or color (e.g., RGB) matrix, where each cell in the matrix represents brightness and color of a single pixel. The depth data may be a matrix (of the same size as the texture matrix) that defines depth for each of the pixels in the texture matrix.

The image processing application may use the image data 114 and 116 to form, at step 106, component depth (CDMs) 118, and form, at step 108, multiple focal planes (MFPs) 120 (e.g., five planes or any other suitable number). In some embodiments, the image processing application may use systems and methods described in the U.S. patent application Ser. No. 17/863,793, "SYSTEMS AND METHODS FOR REDUCING A NUMBER OF FOCAL PLANES USED TO DISPLAY THREE-DIMENSIONAL OBJECTS," the ("'793 application"), which is incorporated herein in its entirety. In particular such techniques may be used to form the CDMs 118 for five focal planes 120. Illustrative techniques for generating the CDMs using depth blending are described below in relation to FIG. 1B.

Depth blending may be used to decompose a depth dependent signal (e.g., depth and texture 114, 116) into a chosen number of depth ranges. For example, the depth dependent signal 114 may be a texture image (video frame) of a scene, for which a corresponding depth map 116 indicates depth dependencies pixel-by-pixel. A depth map 116 can be formed e.g., by a stereoscopic camera or more generally by multiple displaced cameras (i.e., a camera grid), or by an RGBD (Red, Green, Blue, Depth) or ToF (time-of-flight) sensor. Using e.g., neural networks, a depth map may even be derived from the 3D-cues of a monocular image.

In one approach, step 106 uses depth blending to decompose a depth map into slices/planes in depth (CDMs 118), which may overlap partially depending on the used depth blending functions. In some embodiments, depth blending functions comply with a partition of unity property, meaning that the sum of the blending functions is unity, i.e., a normalized value (one), or e.g., the maximum signal value (255 if an 8-bit unsigned range is used, or $2^n-1$ if an n-bit ranges is used). Examples of a depth blending function are shown below in FIGS. 3A-3C. In some examples (e.g., as shown in FIGS. 3A-3C) the function may be reversible, e.g., such that depth data 116 could be recovered based on the CDMs 118. Such functions may be used when CDMs are coded for transmission. In other examples, any kind of depth blending function may be used (e.g., when scaled CDMFPs 124 are coded for transmission).

In some embodiments, unlike MFPs (e.g., as generated in step 108), CDMs cover the whole dynamic range chosen/available for the depth values, which in one example case for 8-bit depth values vary between 0 and 255. Using full dynamic range for each CDM for each depth range results in smaller average quantization/coding errors when further compressing depth components for transmission. While 8-bit depth maps are used in this description as an example, RGBD cameras may produce depth maps using 16 bit/pixel or any other suitable number of bits per pixel. In some approaches, sensors output distances from the sensor directly in millimeters. In such example, 16 bits of data could cover distances up to 65536 mm.

In some examples, RealSense RGBD sensor may use only values 0-4050 from its 16-bit output values, corresponding to the depth range up to 4 m. In some embodiments, value 0 may be reserved to express a void or failed measurement, e.g., when the sensor is not getting backscatter from a distant object. For example, when a depth map is rendered as a gray scale image, this effect may show up as black pixels/areas inside otherwise lighter, more distant areas. Void pixels cause abrupt dynamic changes and are difficult to encode with any image/video coding approach without making at least some preprocessing (e.g., to clean up such values). In some embodiments, any convention between a depth map luminance and distance value may be used. In addition to the polarity of scale convention, this includes the use of a dioptric or any other (linear of nonlinear) scale in mapping distances to depth map luminance.

In some embodiments the MFPs 120 may be formed 108 by applying respective CDMs 118 to the texture image 114 (e.g., by multiplying each respective CDM by the texture, weighing the texture by each CDM, scaling the texture by CDM, etc.). In some embodiments, this step may be optional, for example, if the CDM decomposition 106 is used for coding depth data and not for display of the image using MFPs. In this case, MFPs will not be generated and/or stored by the image processing application.

At step 110, the image processing application may form CDMFPs 122 based on the CDMs 106. For example, each of CDM 118 may be multiplied by depth map 116 to form CDMFPs. In another example, each of CDM 118 may be scaled or weighted by depth 116 to form CDMFPs.

At step 112, the image processing application may form scaled CDMFPs (SCDMFPs) 124. For example, each CDMFP may be scaled based on a value of CDFMPF (e.g., highest value, maximum value, or a value close to maximum) to take advantage of the full dynamic range. Details of scaling are described below, e.g., in relation to FIG. 7B. The SCDMFPs 124 may be encoded for transmission as discussed below, e.g., in relation FIG. 5. In some embodiments the scaling information is defined in advance or transmitted along with the SCDMFPs 124 such that the pre-scaled SCDMFPs may be recovered and used to re-form the depth data 116.

Figure 1B:
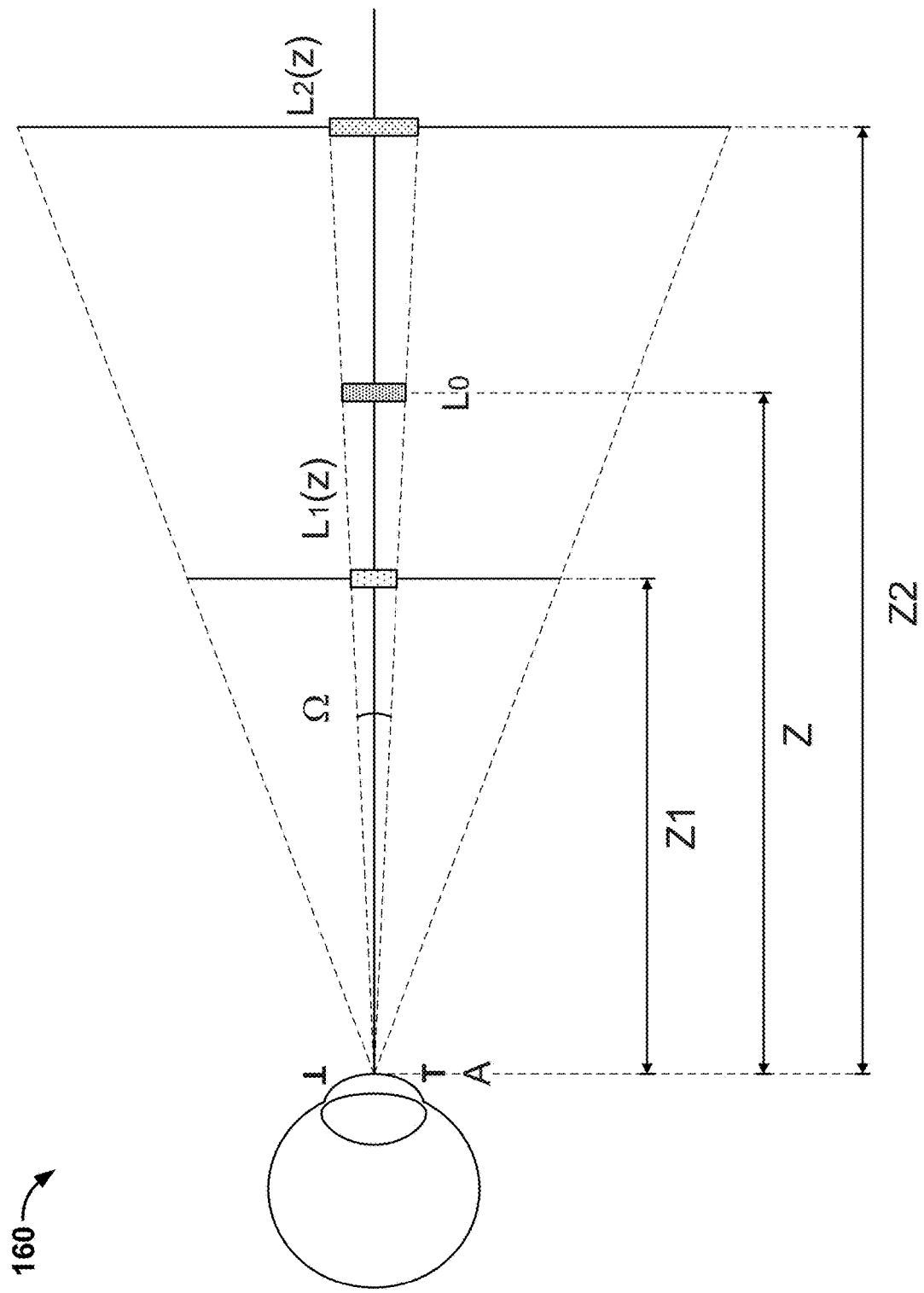
FIG. 1B depicts an example of depth blending techniques, in accordance with some embodiments of this disclosure.

FIG. 1B depicts an example of depth blending techniques (e.g., to form CDMs based on texture and depth), in accordance with some embodiments of this disclosure.

For example, in a case where there are only two planes ($L_1$ and $L_2$) that generate blended voxels, the depth blending 160 between the two focal planes may be determined according to the following equation:

$$L_0 = L_1(z) + L_2(z) = w_1(z)L_0 + w_2(z)L_0$$

where $w_1$ and $w_2$ are depth-weighted fusing functions. The perceived depth z of the fused voxel may be considered as a function of the depth-weighted fusing functions: $z = f(w_1, w_2)$, where a simple approximation function may be the weighted sum of the depths of the two focal planes: $z = w_1(z)z_1 + w_2(z)z_2$. The meaning of symbols of the equation above are demonstrated by FIG. 1B. In particular, A refers to aperture of the eye, $L_1$ and $L_2$ refer to blended luminance values on focal planes at distances $z_1$ and $z_2$, $L_0$ refers to the luminance value of the voxel to be blended at distance z. The symbol $\Omega$ refers to view angle from the eye through distances $z_1$ and $z_2$.

Figure 2:
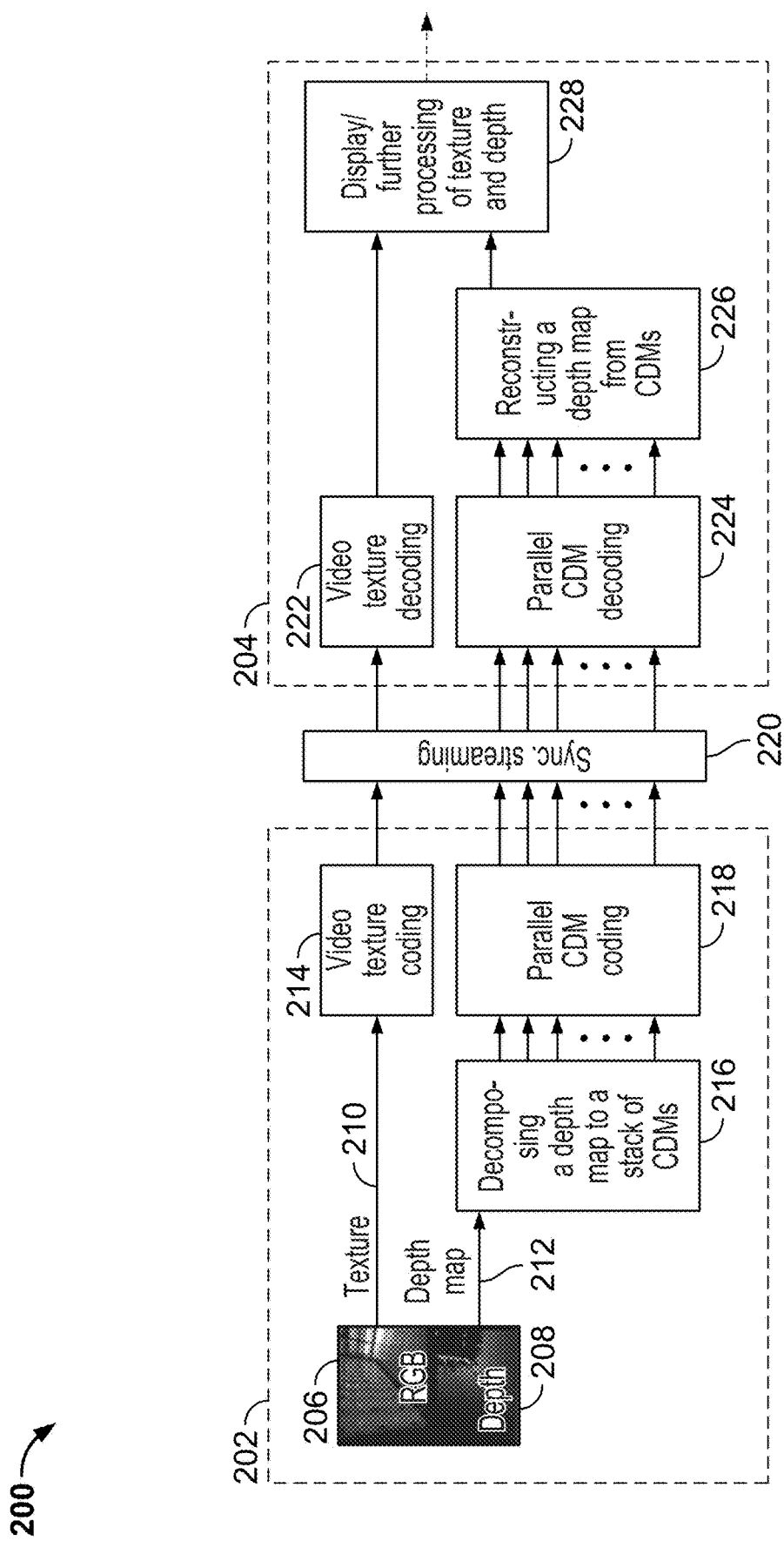
FIG. 2 depicts a system for transmission of image data, in accordance with some embodiments of this disclosure.

FIG. 2 depicts a system 200 for transmission of image data, in accordance with some embodiments of this disclosure.

In the shown embodiment, server 202 (e.g., when executing the image processing application) may access image data including texture data 206 and depth data 208 (e.g., the same as elements 114 and 116 of FIG. 1A). The image data may be accessed in the local database, provided by a sensor, or received from another remote device.

At 216, depth data 208 may be transmitted 212 and decomposed 216 into a stack of CDMs (e.g., CDMs 118 of FIG. 1A). If the decomposition function has a partition of unity property, the CDMs will sum to unity (1 if scaling is used or $2^n - 1$ for n-bit data) in all locations of the matrix. Additionally, the decomposition function that is used for this decomposition is reversible, that is the function is selected such that the depth information 208 may be recovered from the decomposed CDMs generated at step 216.

At 218, the server 202 performs parallel coding of CDMs generated at step 216. For example, a coding stream may be generated based on each respective CDM generated for each interlapping depth range of the depth data 208. In FIG. 2, only one texture and depth map frame are shown as input. However, the input may be a sequence of such frames, and correspondingly CDMs form parallel streams of images for which both interframe and intraframe coding and decoding methods can be applied. Any suitable lossless or lossy encoding techniques may be used for each stream (e.g., MPEG, HLS, DivX, etc.). In some embodiments, any suitable protocols and tools (e.g., wrappers or containers) may be used. For example, to code data, server 202 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above.

In some embodiments, different coding techniques are applied to different CDM streams at different depths. For example, server 202 may determine that some key depth ranges contain objects and/or are less noisy, while other depth ranges (e.g., containing reflections from the scene background) are noisier and include less objects. In some embodiment, different coding techniques may be applied to non-key ranges (e.g., quadtree coding methods). In some embodiment, streams in key ranges may be encoded at higher bit rate than streams in non-key depth ranges. Further ways to encode different streams in different qualities are described below in relation to FIGS. 8 and 9.

In some embodiments, the CDM streams are coded 218 by server 202 in parallel fashion. For example, streams are marked with markers (e.g., timestamps and labels in their headers) that allows CDMs of the same frame to be collected together. In some embodiments, server 202 also transmits 210 texture data 206 for video encoding 214. Any suitable video encoding technique may be used to encode the texture data 206. In some embodiments, video encoding 214 is synchronized with CDM encoding 218, e.g., the texture stream may be marked with data (e.g., in the stream header) that allows for synchronization with CDM streams generated based on depth data 208 that is associated with the texture data 206. In some embodiments, the encoded CDMs and the relevant encoded texture may be sent together as part of data structure or container.

In some embodiments, the server 202 may allocate bits between texture encoding and depth encoding. For example, in some instances more bits may be allocated to video encoding 214 if texture is more important than depth (e.g., if most of the frame is taken by a 2D menu floating on top of video). In other instances, more bits may be allocated to depth encoding 218 if depth is more important (e.g., if multiple objects at different depth are shown).

Figure 11:
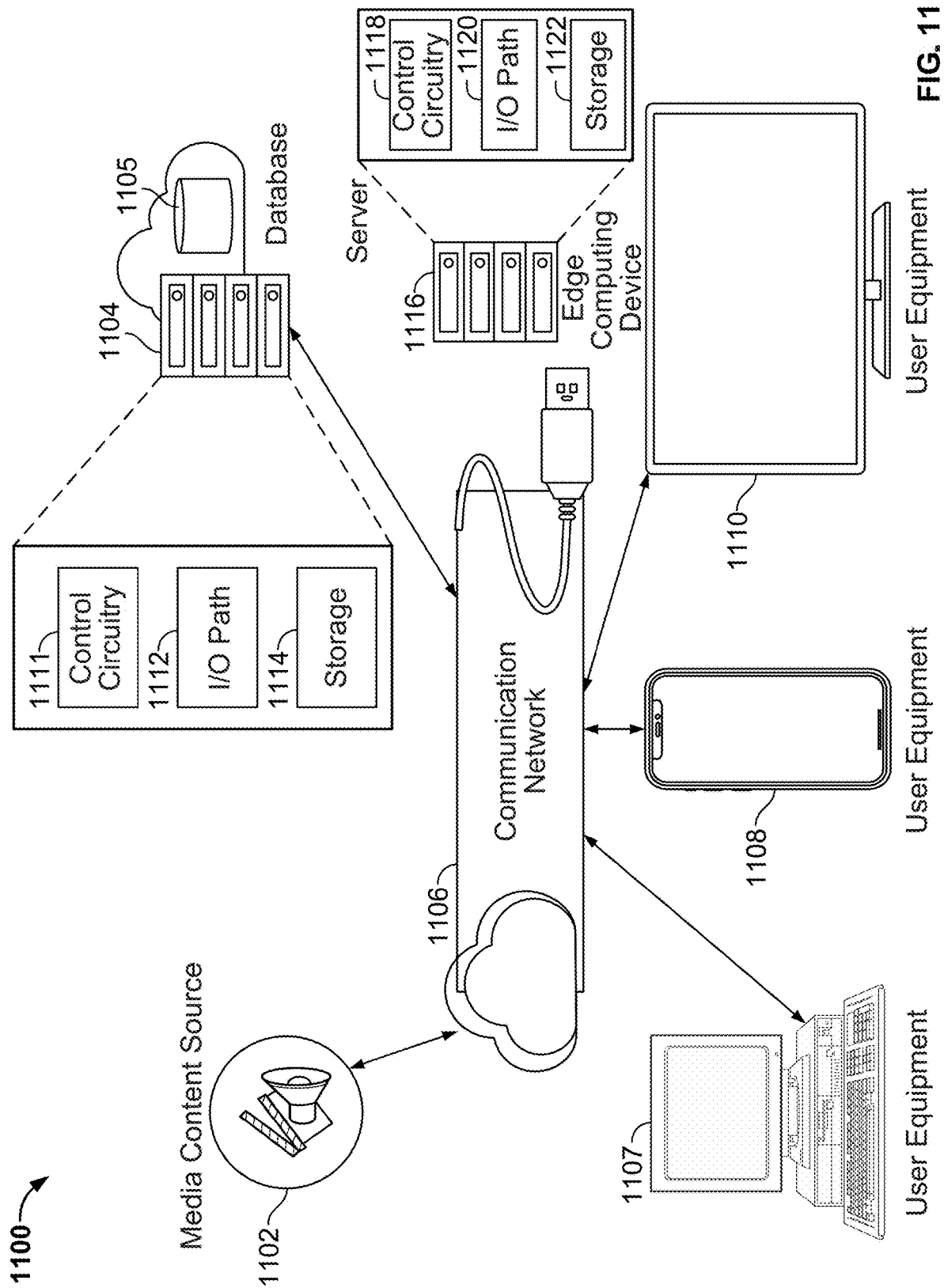
FIG. 11 is a diagram of an illustrative system for encoding/decoding, in accordance with some embodiments of this disclosure.

Once encoding is complete, server 202 may transmit 220 the encoded data over any kind of a network (e.g., network 1106 of FIG. 11). As mentioned above, the texture and CDM streams may be synchronized (e.g., by markers in the headers). For example, the streaming may occur from a server 202 to client 204 (e.g., a mobile device or head-mounted display, or any other suitable client device).

Stream 220 causes client 204 to decode and display (or further process) an image based on recovered depth data 208 and texture data 206. For example, client 204 may decode texture (e.g., using any suitable codec) 222 and decode 224 the multiple parallel CDM streams for all depth ranges. For example, texture and parallel CDM streams may be extracted from a container and decoded together. At 226, the client reconstructs the depth data if the data was encoded using a reversible blending function (e.g., as described in FIG. 3D). Once the texture data and depth data for that texture are recovered by the client 204, the client 204 may generate 228 image data for display, storage or for further processing (e.g., further editing, or manipulation) using any suitable 3D image generation technique. In some embodiments, further processing may be e.g., computer analysis for detecting and tracking objects at different distances (depth) of the scene. In some embodiments, if the client 204 is an MFP display, recovery of depth data may not be needed. Instead, client 204 may create MFP by multiplying texture decoded at 222 by each respective CDM of CDMs decoded at step 224. The MFPs may then be used directly to generate for display a version of image data with texture 206 and depth data 208. In this case, any depth blending function may be used as it does not have to be reversible.

In the example shown in FIG. 1A, five CDMs are generated for transmission by server 202 based on depth matrix d(x,y). For example, the five CDMs may be five matrices $d_i(x,y)$ (where $d_1(x,y)$ is a first CDM for a first depth range, $d_2(x,y)$ is a second CMD for second depth range, etc.). The CDM may have been generated by mapping (replacing) each pixel depth d(x, y) by a depth dependent value $w_i(d)$, where e.g., i=1 . . . 5. Similar technique may be used for any number of CDMs for any number of depth ranges, e.g., value of i may vary between 1 and 10, 1 and 20, etc.

The coded CDMs $d_i$ (x,y) may be transmitted 220 and decoded by client 204. If any arbitrary blending function was used to generate the CDMs, only a part of the original depth data d could be reconstructed by client 204 based on each CDM. However, when some specific functions (e.g., linear tent blending functions, or sinusoid blending function) are used, each CDMs includes weighted depth information over one (applicable to the backmost and frontmost CDMs) or two depth plane distances (applicable CDMs in the middle).

In such embodiments, a full depth map may be recovered by client 204 as a compilation of inversely weighted/mapped CDMs. Because coding errors in different CDMs are largely independent, they are partly averaged out when compiling the overall depth map, thus increasing the coding precision. Each CDM contains only a part of the original content and are thus also easier to encode. Further, a full coding precision of the chosen coding scheme (e.g., 12 bits/pixel) is available to each component, enabling higher accuracy in general.

By increasing the number of parallel CDM streams, coding accuracy can thus be increased despite each of the components being coded with a limited accuracy, e.g., due to the coding method and its pixel depth (bits/pixel). In some embodiments, the blending function may be chosen for its effect on quality. For example, a smoother blending function (e.g., having a continuous first derivative) may be beneficial compared to the pointy tent function.

FIGS. 3A-C depict an example of depth blending techniques, in accordance with some embodiments of this disclosure. In particular, FIGS. 3A-C illustrate an example function that may be used to generate CDMs 118 as part of step 106 of FIG. 1A or step 216 of FIG. 2.

FIG. 3A shows a graph 302 of an example tent function. The "tent" is defined by a first line that intersects the x-axis at point a and a second line that that intersects the x-axis at point c. The lines further intersect at point b along the x axis. As shown, the x-axis corresponds to possible depth values. While depth values between 0 and 255 are shown for 8-bit matrices, any other ranges of depth values may be handled in a similar fashion.

FIG. 3B shows a graph 304 of an example set of tent functions. Multiple (e.g., 5 or any number i) tent functions may be each be defined by respective points $a_i$, $b_i$, and $c_i$. As shown, five tent functions are shown for (e.g., for creating 5 CDMs 118). For each depth value x, two depth function values $w_{j1}(x)$ and $w_{j2}(x)$ can be computed by image processing application, each contributing to different component depth map in different depth ranges. Consequently, each depth value x in a respective position in depth matrix d will contribute to values in the respective position in two CDMs.

FIG. 3C shows a formula 306 for computing each depth function value $w_i$ (e.g., for i in range 1-5) based on tent functions 304 in FIG. 3B. As shown the blending function 306 maps each depth value to at most two adjacent CDMs, and CDM values at other CDMs are zeroes. The formula 306 is reversible, as explained below.

FIG. 3D depicts an example formula 308 for reversing depth blending (e.g., depth blending in accordance with formula 306), in accordance with some embodiments of this disclosure. In particular, depth data d is recovered based on depth function values $w_{j1}(x)$ and $w_{j2}(x)$ that were computed, e.g., as shown in FIG. 3C.

In some embodiments, coding and decoding CDMs using lossy coding may cause a non-zero value to appear for a CDM pixel which originally (before coding) had a zero value. Correspondingly, in such embodiments, an inverse process for (linear tent filter) depth blending cannot solely rely on using two coded component depth maps as a source for re-composing a coded depth plane. A comparable problem is addressed e.g., in digital video coding systems commonly by adding checks to arithmetic operations (not allowing overflows), and by limiting/saturating video signals e.g., between values 16-235 before (and after) encoding.

In some embodiments, alternative blending functions may be used. Blending functions may affect to the transitions and overlap of the component signals and thus their coding quality and efficiency. Their reverse mapping (re-composing) procedures may be modified accordingly. In particular, more than two overlapping blending functions may be considered when reconstructing a depth map at each depth range (i.e., more than the two overlapping tent functions in the disclosed example).

In some embodiments the partition of unity requirement may be relaxed (e.g., if CDMs are used solely to code depth data and MFPs are not used to actually display the coded image). Accordingly, when blending function is being used solely for forming component depth maps (CDMs) for compression, any function may be used which provides desired properties and keeps the blending results within an accepted range of signal values even if partition of unity is not met. In some embodiments, in addition to the blended pixel values, knowledge on the blending function(s) used by server 202 may be delivered to the receiver 204 to enable recovery of depth data at step 226.

Figure 7A:
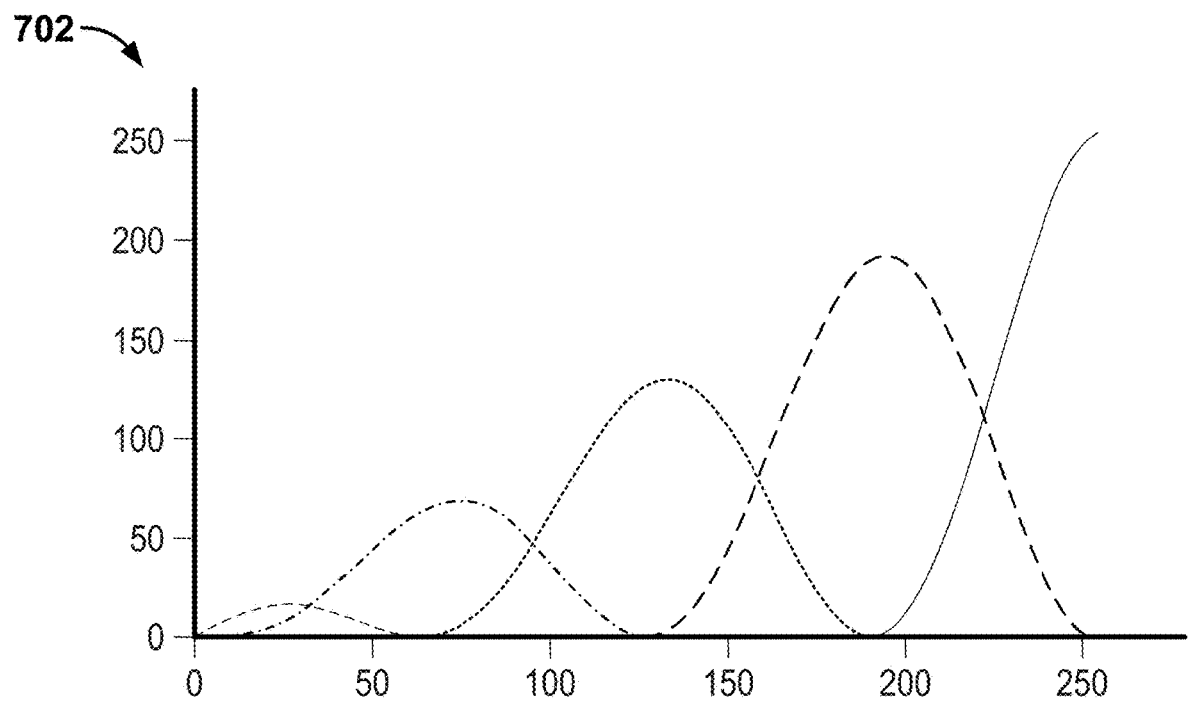
FIG. 7A depicts another example of depth blending, in accordance with some embodiments of this disclosure.
Figure 7B:
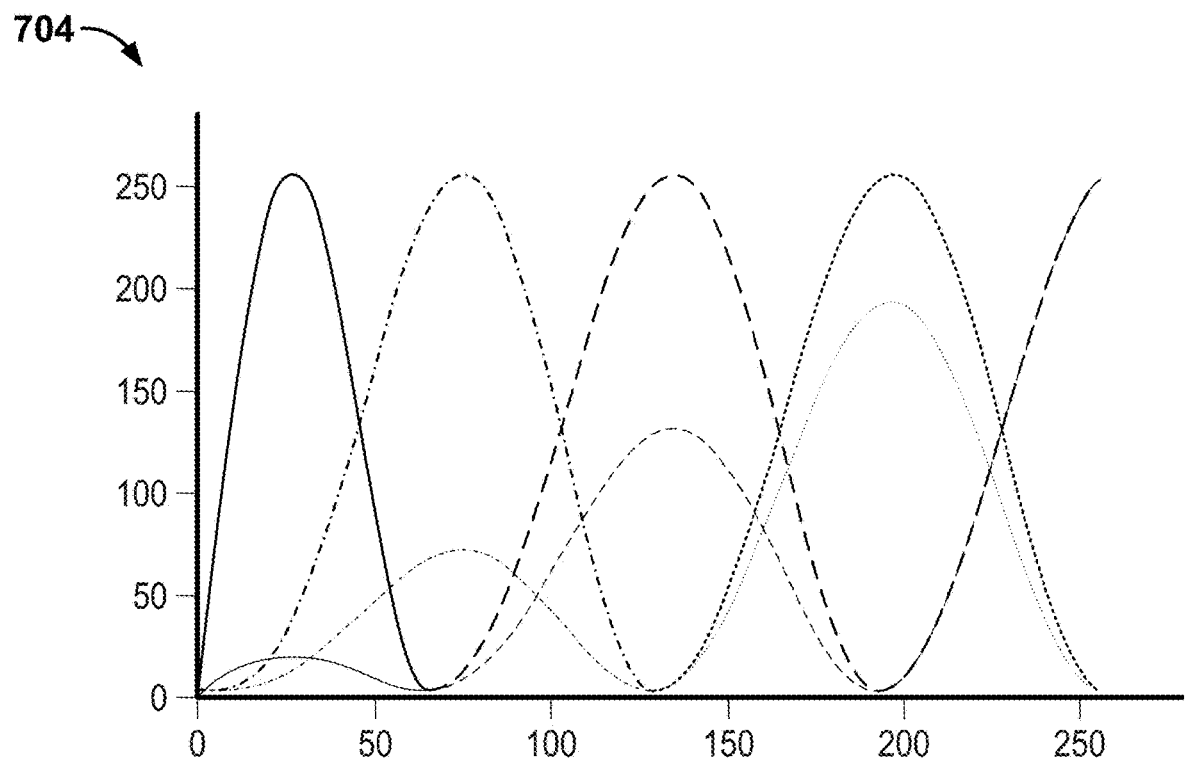
FIG. 7B depicts yet another example of depth blending, in accordance with some embodiments of this disclosure.

While tent functions were shown in FIGS. 3A-3C, any suitable blending function may be used instead (e.g., sinusoid functions as shown in FIGS. 7A-B).

In some embodiments, blending functions result in values that typically add up to the maximum depth value (255, when using 8 bit/pixel or to $2^n-1$ when using n bit/pixel). This is a property known as "partition of unity", referring to expressing blending weights scaled between 0-1 (for any bit/pixel). This requirement can be fulfilled with an infinite number of suitable functions. In addition to linear (tent) functions, various other blending functions may be used, including polynomial, (piecewise) sinusoidal functions, spline functions, sc. bump functions (and their complements), blending by smooth transition functions, and different variations approximating partition of unity (e.g., using Friedrich's mollifiers).

In some embodiments, image data may be pre-processed, e.g., to eliminate characteristic distortions of some sensors. For example, instead of sending 'non-metric' void values among metric distances as with some Kinect type of sensors (i.e., zero flags meaning missing backscatter, not zero distances), the image processing application may patch void values by interpolation from neighboring data.

In some implementations, sensing is often disturbed by various factors like stray and ambient lights (especially outdoors), or highly reflective or non-reflective materials. As less backscatter is achieved from distant objects and surfaces, signal disturbances (e.g., noise) show up especially at bigger distances. For example, RGBD sensors may output distances from the sensor, i.e., show up smaller distances as darker pixels, when a depth map is rendered as a grey scale image. This differs from the examples in FIG. 1A, where closer objects are better lit (traditional convention in camera based DIBR systems).

In some implementations where depth blending is used for forming focal planes for accommodative perception, the scale for depth may be dioptric or otherwise nonlinear. A variation of the disclosed approach may also use nonlinear (e.g., dioptric) depth scale after corresponding changes to used equations and algorithms.

The CDM coding techniques described above may be further be improved by using a variety of additional techniques. For example, coding method for each CDM (e.g., of CDMs 118) may be optimized. For example, the image processing application may adapt to the specific error characteristics/statistics on each depth plane. For example, the more distant CDMs may have more random/specific type of noise due to smaller backscatter to depth sensors, and may be better coded by different approaches than the close CDMs.

In another example, the image processing application may optimize a joint coding method over several CDMs. For example, CDMs may be not totally independent, as an object or surface can extend over several CDMs. In such cases, the image processing application may use a predictive coding method that is applied to capture predictions between several (neighboring) component depth maps, e.g., to achieve inter-CDM predictive coding.

In another example, the image processing application may use selective coding of entire component depth maps. For example, the image processing application may not code or send pixel data for those component depth maps that contain no useful information at all (e.g., in a situation where a scene and its object are all further away from the camera/sensor and some depth ranges have no objects). In some cases where the front is empty of objects the image processing application may begin coding from the back. In these implementations, the image processing application may only send coded CDMs to the client 204.

In another example, the image processing application may perform hierarchical coding of each CDM (e.g., by splitting each frame into blocks/objects/areas). In these implementations, the image processing application may send selections for coded/not coded blocks (objects, areas) to the decoder of client 204. Also, the image processing application may send data only for the coded CDM blocks, objects, areas.

FIG. 4 depicts an example 404 of depth data coding, in accordance with some embodiments of this disclosure.

FIG. 4 shows a simplified example how a depth map decomposition (e.g., as shown in FIGS. 1A and 2) increases coding quality. In the example, original depth map (e.g., depth map 116 of FIG. 1A) is provided with 10 bits/pixel quality, while coding of components is performed at 8 bits/pixel. 10 and 8 bits are provided as example only and any suitable initial and coded bit length may be used.

In both examples A (coding directly with limited quality) and B (coding with blended components) initial input d(in) is coded and then recovered (with quality loss) as d'(out). In case A of example 404, d(in) is rounded to 8 bits and encoded. The encoded data is transmitted and recovered with some errors. Numeral errors persist when recovered data is transformed to 10 bits d'(out) output.

In case B of example 404, d(in) is depth blended to produce two smaller 10-bit values. Each of the blended values is rounded to 10 bits, and then transformed into 8 bits/pixel format. Each of the 8-bit values is separately coded and transmitted. The 8-bit values and recomposed by the receiver (e.g., as shown in FIG. 3D). The components are then averaged, resulting in increased quality as compared to case A.

Figure 5:
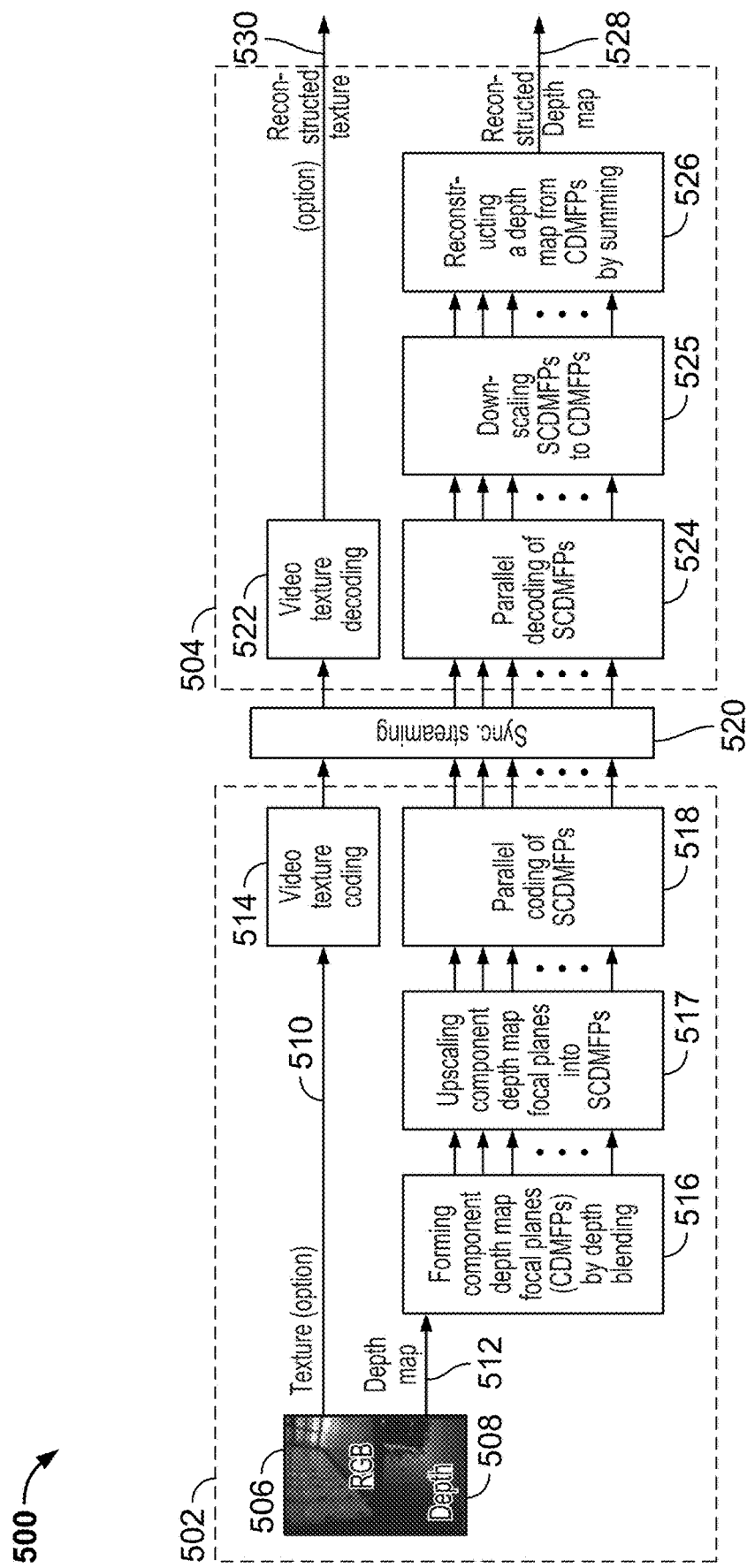
FIG. 5 depicts a system for transmission of image data, in accordance with some embodiments of this disclosure.

FIG. 5 depicts a system 500 for transmission of image data, in accordance with some embodiments of this disclosure. In particular, system 500 operates similarly to system 200 of FIG. 2 but transmit scaled CDFMPs (SCDMFPs) that are generated, e.g., as shown in steps 110 and 112 of FIG. 1. Further techniques for generating SCDMFPs are also shown and explained in FIGS. 6A, 6B, 7A, and 7B.

In the shown embodiment, server 502 (e.g., when executing the image processing application) may access image data including texture data 506 and depth data 508 (e.g., the same as elements 114 and 116 of FIG. 1). The image data may be accessed in the local database, provided by a senor, or received from another remote device.

At 516, depth data 508 may be transmitted 512 and decomposed 516 into a stack of CDMs (e.g., CDMs 118 of FIG. 1A) for a set of depth ranges. CDMs are then transformed into CDMFPs, e.g., by multiplying each respective CDMs by the depth data 508.

At 517, server 502 upscales the CDMFPs to scaled CDFMPs (SCDMFPs) to take advantage of the full available dynamic range (e.g., to 255 if 8-bit data use used or to $2^n-1$ if n bit data is used). For example, the scaling may be performed based on a larger or largest value in each respective CDMFP. The scaling factor or the knowledge of blending functions may be transmitted along each SCDMFP.

At 518, the server 502 performs parallel coding of SCDMFPs generated at step 516. For example, a coding stream may be generated based on each respective SCDMFPs generated for each depth range of the depth data 508. In FIG. 5, only one texture and depth map frame are shown as input. However, the input may be a sequence of such frames, and correspondingly SCDMFPs form parallel streams of images for which both interframe and intraframe coding and decoding methods can be applied. Any suitable lossless or lossy encoding techniques may be used for each stream (e.g., MPEG, HLS, DivX, etc.). In some embodiments, any suitable protocols, and tools (e.g., wrappers or containers) may be used. For example, to code data, server 502 may uses one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above.

In some embodiments, different coding techniques are applied to different SCDMFPs streams at different depths. For example, server 502 may determine that some key depth ranges contain objects and/or are less noisy, while other depth ranges (typically deeper ranges reflective of background) are noisier and include less objects. In some embodiment, different coding techniques may be applied to non-key ranges (e.g., quadtree coding methods). In some embodiment, streams in key ranges may be encoded at higher bit rate than streams in non-key depth ranges. Further ways to encode different streams in different qualities are described below in relation to FIGS. 8 and 9.

In some embodiments, the SCDMFPs streams are coded 518 by server 502 in parallel fashion. For example, streams are marked with markers (e.g., timestamps and labels in their headers) that allows SCDMFPs of the same frame to be collected together. In some embodiments, server 502 also transmits 510 encoded texture data 506 for video encoding 514. Any suitable video encoding technique may be used to encode the texture data 506. In some embodiments, video encoding 514 is synchronized with SCDMFPs encoding 518, e.g., the texture stream may be marked with data (e.g., timestamps in the stream header) that allows for synchronization with SCDMFPs streams generated based on depth data 508 that is associated with the texture data 506. In some embodiments, the encoded SCDMFPs and the relevant encoded texture may be sent together as part of data structure or container.

In some embodiments, the server 502 may allocate bits between texture encoding and depth encoding. For example, in some instances more bits may be allocated to video encoding 514 if texture is more important than depth (e.g., if most of the frame is taken by a 2D menu floating on top of video). In other instances, more bits may be allocated to depth encoding 518 if depth is more important (e.g., if multiple objects at different depths are shown).

Once encoding is complete, server 502 may transmit 520 the encoded data over any kind of a network (e.g., network 1106 of FIG. 11). As mentioned above, the texture and SCDMFPs streams may be synchronized (e.g., by timestamps in the headers). For example, the streaming may occur from a server 502 to client 504 (e.g., a mobile device or head-mounted display, or any other suitable client device).

Stream 520 causes client 504 to decode and display an image based on initial depth data 508 and texture data 506. For example, client 504 may decode 522 texture and decode 524 the multiple parallel SCDMFPs streams for all depth ranges. At 525, SCDMFPs are downscaled (e.g., based on scaling factor included in transmission 520) to form recovered CDMFPs.

At 526, the client 504 reconstructs the depth data based on the recovered CDMFPs (e.g., by adding them together). Following from the partition of unity property of CDMs, CDMFPs sum up to depth data. Advantageously, since CDMFPs will always sum to depth data, any blending function fulfilling the partition of unity property may be used. Once the texture data 530 and depth data 528 for texture data 530 are recovered by the client 504, the client 504 may generate image data for display, storage or for further processing (e.g., further editing, or manipulation) using any suitable 3D image generation technique. The client 504 may also apply any other further processing to the image data.

Figure 6A:
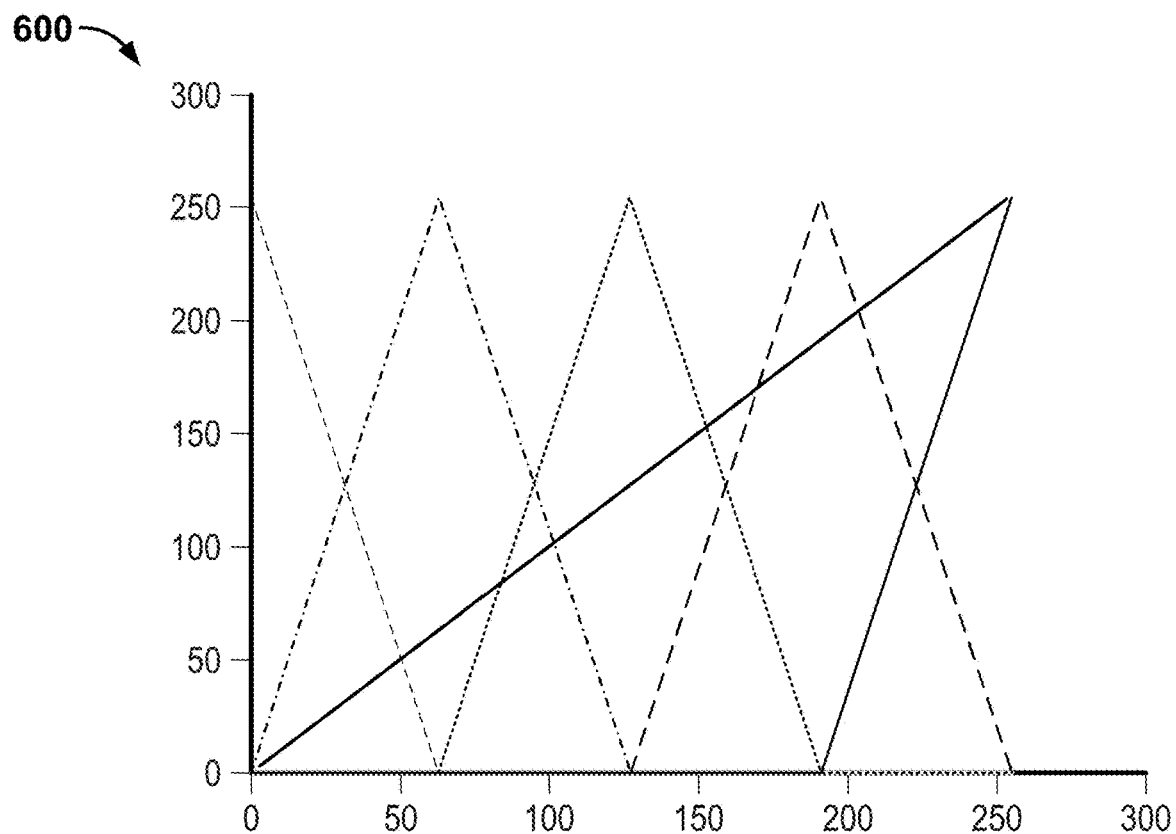
FIG. 6A depicts an example of depth blending, in accordance with some embodiments of this disclosure.

FIG. 6A depicts an example 600 of depth blending, in accordance with some embodiments of this disclosure. In particular, example 600 depicts same or similar set (e.g., 5) of tent functions for processing depth values in 0-255 range as showing in FIG. 3B. As shown, any input depth value along x axis will result in two blended output values along y axis for any 5 depth ranges (0-63, 0-127, 64-191, 128-255, 192-255). Accordingly, the function showing in example 600, can be used to decompose input depth matrix d (e.g., element 116 of FIG. 1A) into 5 CDMs, where each value in matrix d contributes to 2 CDMs for each of the 5 ranges (0-63, 0-127, 64-191, 128-255, 192-255).

In addition to the tent function a unity (y=x) function as shown as a diagonal line. Multiplication by the unity function will result in a formula that may be used in formation of CDMPFs based on CDMs (because CDMPFS are formed by multiplication of each CDM by the depth matrix).

Figure 6B:
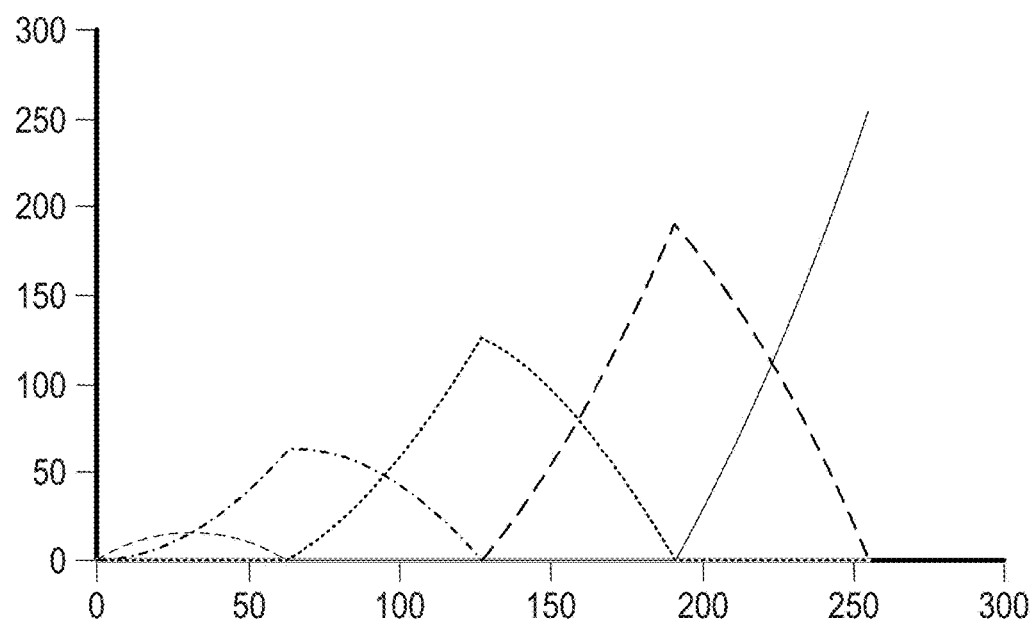
FIG. 6B depicts another example of depth blending, in accordance with some embodiments of this disclosure.

FIG. 6B depicts another example 602 of depth blending, in accordance with some embodiments of this disclosure. In particular the tent function lines of example 600 are transformed into two increasing sawtooth lines (e.g., by multiplying tent functions from example 600 by the unity function) to create functions for forming CDMPFS. As shown any input depth value along x axis will result in two blended output values along y axis for any 5 depth ranges ((0-63, 0-127, 64-191, 128-255, 192-255). Accordingly, the function shown in example 602, can be used to decompose input depth matrix d (e.g., element 116 of FIG. 1A) into 5 CDMFPs, where each value in the depth matrix d contributes to 2 CDMFPs for each of the 5 ranges.

As can be seen, unlike the functions for CDM creation, the functions for CDMFP creation do not take advantage of the full dynamic range at shallow depth ranges. Accordingly, CDMFPs may be scaled before coding and transmission (e.g., as transmission 520 of FIG. 5). In particular, functions of examples 602 may be scaled to 255 for each of the depth ranges. Each gross function has a distinct maximum (as seen in example 602), which can be detected e.g., algorithmically. The scaling factor for multiplying each signal component is calculated as the maximum signal value (e.g., 255 for the 8-bit pixel depth) divided by each local maximum of the corresponding gross function. One skilled in the art will understand that while technique in examples 600 and 602 are shown for 8-bit depth value for 5 CDM decomposition, similar techniques may be used for depth values of any length and for any number of CDMs.

FIG. 7A depicts another example 702 of depth blending functions, in accordance with some embodiments of this disclosure. In particular, example 702 shows CDMFPs formation functions for sinusoidal blending functions instead of tent blending functions shown in FIG. 6A.

FIG. 7B depicts yet another example 704 of depth blending, in accordance with some embodiments of this disclosure. As shown here, the CDMFP formation functions of FIG. 7A are scaled to maximum (e.g., to 255) to take advantage of the full dynamic range. Accordingly, scaled CDMFP or SCDMFP may be formed directly from depth data by the image processing application using the functions depicted in example 704. The scaling factor for each depth range may be saved by the image processing application and transmitted (e.g., via transmission 520 of FIG. 5) along with SCDMFPs to client (e.g., client 504 of FIG. 5) such that the client may recover CDMFPs (e.g., at step 525 of FIG. 5).

Figure 8:
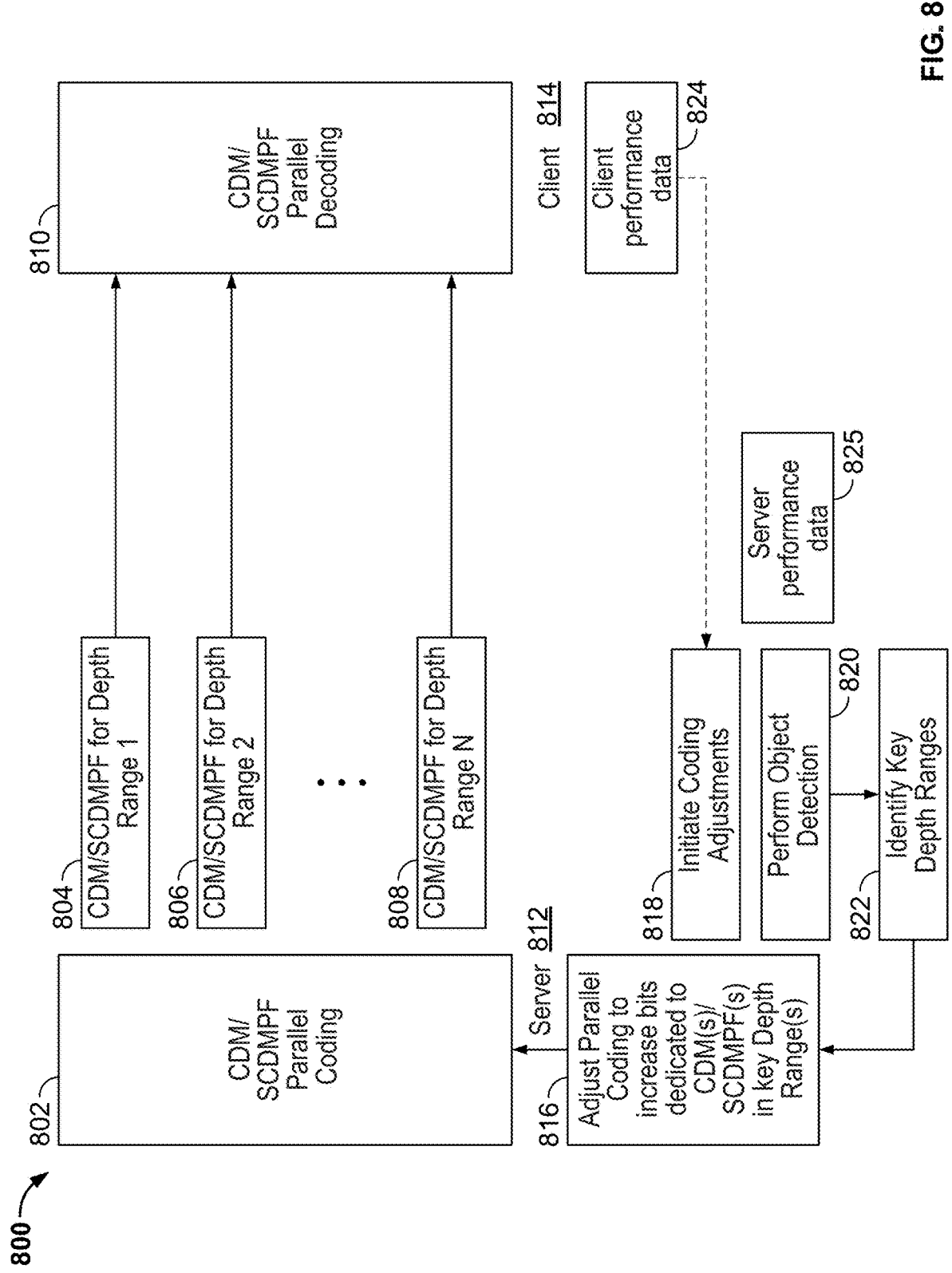
FIG. 8 depicts a system for transmission of image data, in accordance with some embodiments of this disclosure.

FIG. 8 depicts a system 800 for transmission of image data, in accordance with some embodiments of this disclosure.

In some embodiments, system 800 is a variation of system 200 of FIG. 2 or of system 500 of FIG. 5. In particular, coding of CDM or SCDMFP may be improved by performing object detection to identify key depth ranges with objects (or with most objects) and allocating more bits to those ranges.

Block 802 of server 812 (e.g., of server 202 or 502) performs CDM or SCDMFP coding (e.g., as described in elements 216 or 516). In particular, block 802 generates N CDM or SCDMFP streams 804-808 for a set of depth ranges (e.g., 5 ranges). Block 810 (e.g., of client 204 or 504) performs CDM or SCDMFP decoding. The client 814 may reconstruct depth data (e.g., as described in relation to blocks 226 and 526) and use the depth data for image generation.

In some embodiments, client 814 monitors 824 performance and available bandwidth. For example, client may determine that it can only support stream at 4 Mbit/s or at 1 Mbit/s. This data may be transmitted to server 812. In some embodiments, server 812 may monitor performance data 825 in addition to, or instead of client 814/

At 818, server 812 may perform coding adjustments (e.g., based on the client performance data). For example, server 812 may perform object detection at step 820 on image data currently being coded and identify one or more key ranges at step 822 (e.g., server 812 may determine that the back CDM has the most objects). In response, server 812, adjusts 816 the parallel coding at block 802 to allocate more bits to CDMs or SCDMFPs in key ranges and less bits to CDMs or SCDMFPs in other ranges. The process may be repeated as client conditions change and as key depth ranges vary.

Figure 9:
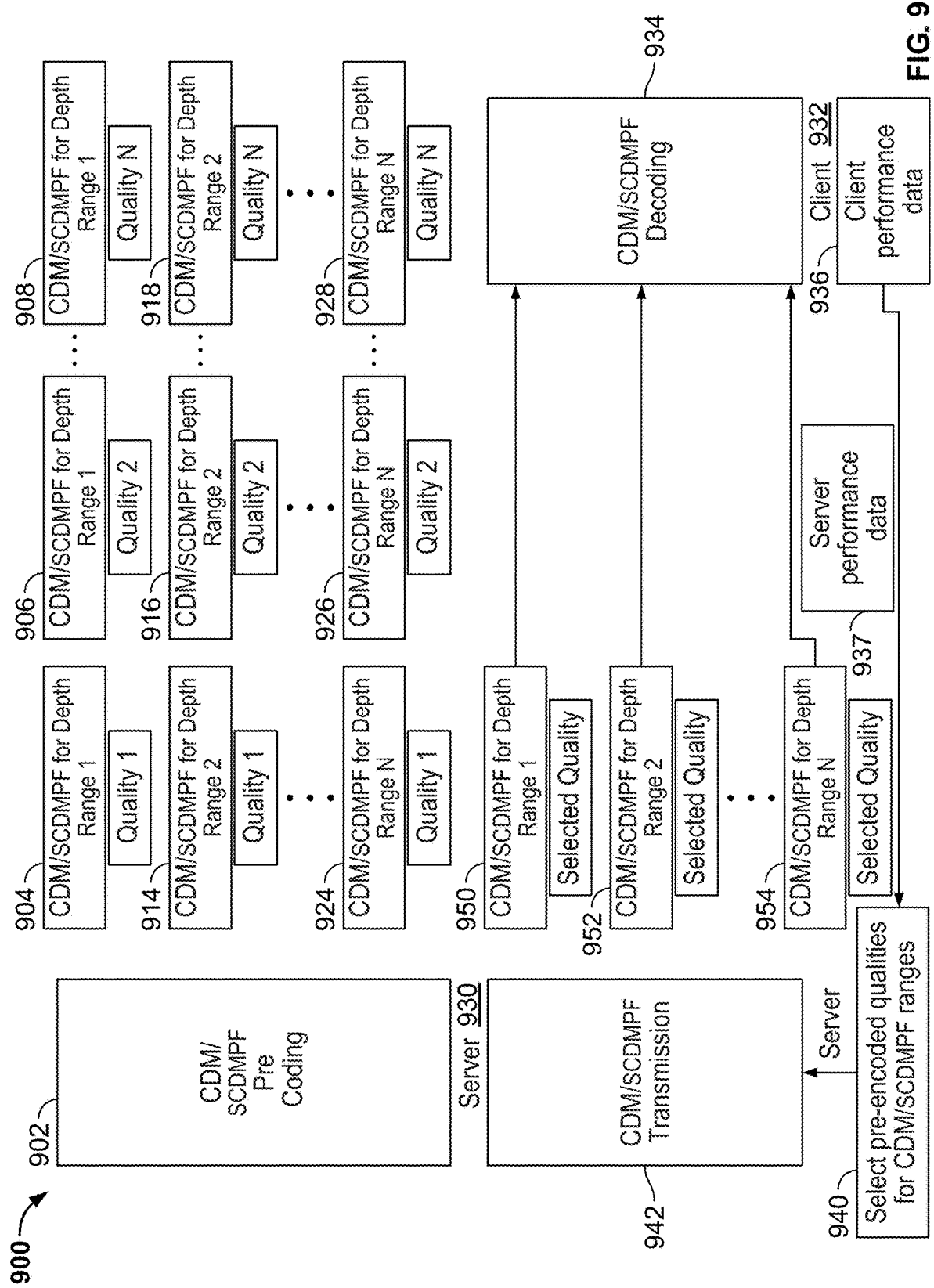
FIG. 9 depicts a system for transmission of image data, in accordance with some embodiments of this disclosure.

FIG. 9 depicts a system 900 for transmission of image data, in accordance with some embodiments of this disclosure.

In some embodiments, system 900 is a variation of system 200 of FIG. 2 or of system 500 of FIG. 5. In particular, transmission of CDM or SCDMFP may be improved by precoding CDM or SCDMFP data in multiple qualities and selectively choosing what quality pre-coded segment to transmit (e.g., based on client performance) for each depth range.

As shown, server 930 pre-codes 902 CDM or SCDMFP data at some time before transmission to generate a range of various pre-coded options for each CDM or SCDMFP in each depth range. For example, for a CDM or an SCDMFP at a first depth range, server 930 may generate N coded variations 904-908 (e.g., coded for 500 kbit/s, 1 Mbit/s, 4 Mbit/s, etc.). Similarly, for CDM or SCDMFP at second depth range, server 930 may generate N coded variations 914-918 (e.g., coded for 500 kbit/s, 1 Mbit/s, 4 Mbit/s, etc.). Such coding may happen for CDM or SCDMFP at each depth range all the way to N coded variations 924-928 (e.g., coded for 500 kbit/s, 1 Mbit/s, 4 Mbit/s, etc.) for final depth range.

The server may also rank the depth ranges by importance (e.g., based on object detection). For example, depth range 1 may be of highest importance, depth range 2 of lower importance, and depth range N may be of lowest importance.

As the time of transmission, server 930 (or any other server such as edge server 616) may transmit coded CDMs or SCDMFP at step 942 (e.g., as shown in steps 220 or 520). For example, streams 950, 952, and 954 may be sent at certain selected quality (which may be different for each depth range). Client 932 may decode 934 CDMs or SCDMFP data to recover depth informational and generate for display or for further processing an image based on the depth data.

In some embodiments, or client 932 monitors 936 performance and available bandwidth. For example, client may determine that it can only support streaming at 4 Mbit/s or at 1 Mbit/s. This data may be transmitted to server 930. In some embodiments, server 930 monitors 937 the performance in addition to or instead of the client.

At 940 a server (e.g., server 930 or another server such as an edge server) uses client performance information and selects pre-encoded qualities for each depth range of CDMs or SCDMFPs. For example, CDM or SCDMFP for range 1 may be transmitted at pre-encoded for 10 Mbit/s (since this is the most important range), CDM or SCDMFP for range 2 may be transmitted at pre-encoded for 4 Mbit/s (since this is the second most important range), and CDM or SCDMFP for range N may be transmitted at pre-encoded for 1 Mbit/s (since this is the least important range). In combination, the total transmission may match data bandwidth which the client can support.

The selected qualities for each depth range may be updated continuously by server 930 as client bandwidth limit and hierarchy of depth importance changes throughout the stream.

Figure 10:
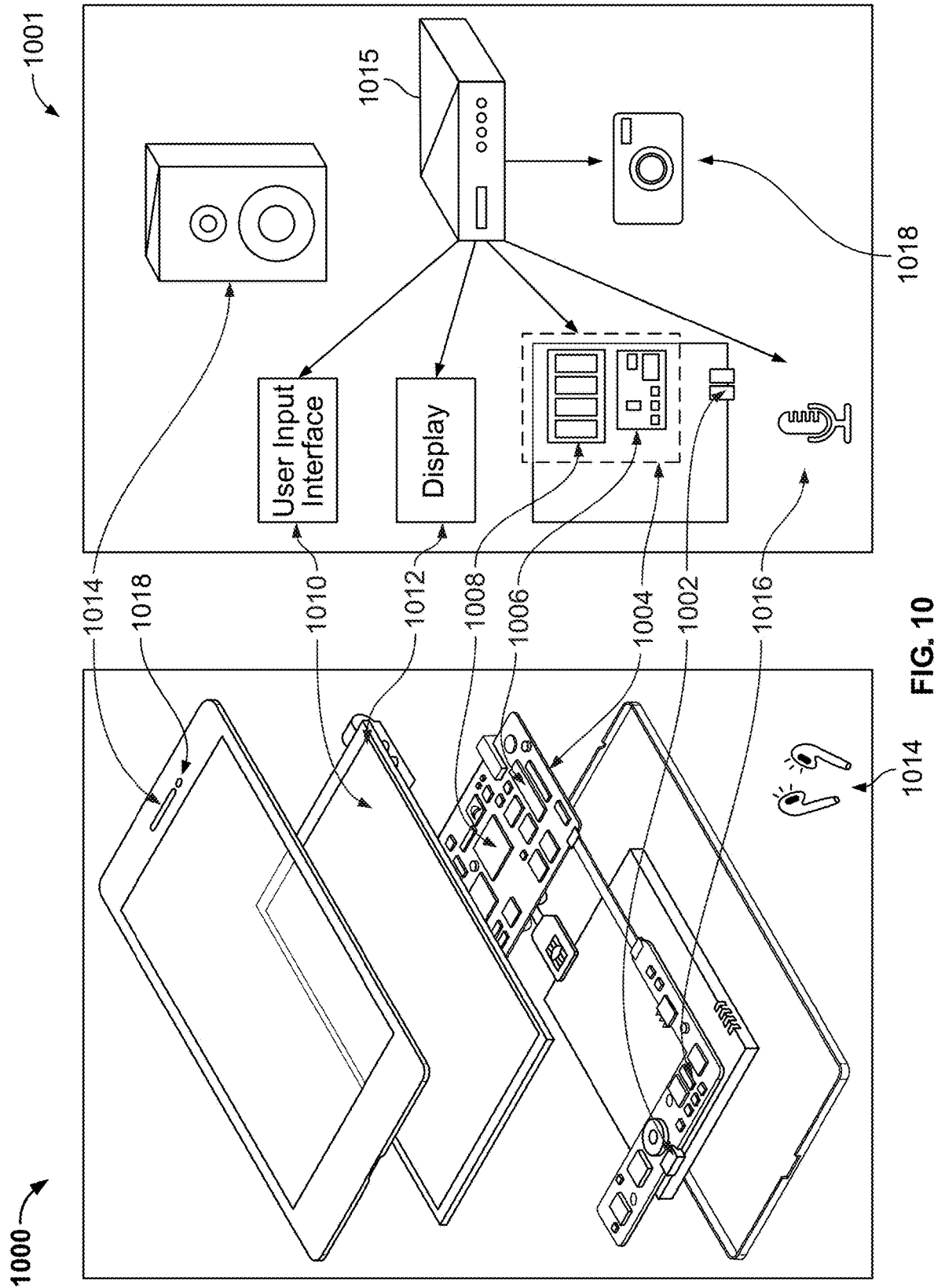
FIG. 10 shows generalized embodiments of illustrative user equipment devices which may perform the functions described herein.

FIGS. 10-11 depict illustrative devices, systems, servers, and related hardware for image encoding/decoding. FIG. 10 shows generalized embodiments of illustrative user equipment devices which may perform the functions described herein. User equipment device 1000 may be a smartphone device, a tablet, a virtual reality or augmented reality device, or any other suitable device capable of processing video data. In another example, user equipment device 1001 may be a user television equipment system or device. User television equipment device 1001 may include set-top box 1015. Set-top box 1015 may be communicatively connected to microphone 1016, audio output equipment (e.g., speaker or headphones 1014), and display 1012. In some embodiments, display 1012 may be a television display, computer display, or a head mounted display comprising a stack of displays. In some embodiments, display 1012 may contain an SLM device. In some embodiments, set-top box 1015 may be communicatively connected to user input interface 1010. In some embodiments, user input interface 1010 may be a remote-control device. Set-top box 1015 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 1000 and user equipment device 1001 may receive content and data via input/output (I/O) path (e.g., circuitry) 1002. I/O path 1002 may provide content (e.g., broadcast programming, on-demand programming, Internet content, content available over a local area network (LAN) or wide area network (WAN), and/or other content) and data to control circuitry 1004, which may comprise processing circuitry 1006 and storage 1008. Control circuitry 1004 may be used to send and receive commands, requests, and other suitable data using I/O path 1002, which may comprise I/O circuitry. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing. While set-top box 1015 is shown in FIG. 11 for illustration, any suitable computing device having processing circuitry, control circuitry, and storage may be used in accordance with the present disclosure. For example, set-top box 1015 may be replaced by, or complemented by, a personal computer (e.g., a notebook, a laptop, a desktop), a smartphone (e.g., device 1100), a tablet, a network-based server hosting a user-accessible client device, a non-user-owned device, any other suitable device, or any combination thereof.

Control circuitry 1004 may be based on any suitable control circuitry such as processing circuitry 1006. As referred to herein, control circuitry should be understood to mean any circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for the image processing application stored in memory (e.g., storage 1008). Specifically, control circuitry 1004 may be instructed by the image processing application to perform the functions discussed above and below. In some implementations, processing or actions performed by control circuitry 1004 may be based on instructions received from the image processing application.

In client/server-based embodiments, control circuitry 1004 may include communications circuitry suitable for communicating with a server or other networks or servers. The image processing application may be a stand-alone application implemented on a device or a server. The image processing application may be implemented as software or a set of executable instructions. The instructions for performing any of the embodiments discussed herein of the image processing application may be encoded on non-transitory computer-readable media (e.g., a hard drive, random-access memory on a DRAM integrated circuit, read-only memory on a BLU-RAY disk, etc.). For example, in FIG. 10, the instructions may be stored in storage 1008, and executed by control circuitry 1004 of a device 1000.

In some embodiments, the image processing application may be a client/server application where only the client application resides on device 1000 (e.g., device 104), and a server application resides on an external server (e.g., server 1104 and/or server 1116). For example, the image processing application may be implemented partially as a client application on control circuitry 1004 of device 1000 and partially on server 1104 as a server application running on control circuitry 1111. Server 1104 may be a part of a local area network with one or more devices 1000 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 1104 and/or edge computing device 1116), referred to as "the cloud." Device 1100 may be a cloud client that relies on the cloud computing capabilities from server 1104 to determine whether processing (e.g., at least a portion of virtual background processing and/or at least a portion of other processing tasks) should be offloaded from the mobile device, and facilitate such offloading. When executed by control circuitry of server 1104 or 1116, the image processing application may instruct control 1111 or 1118 circuitry to perform processing tasks for the client device and facilitate the encoding/decoding.

Control circuitry 1004 may include communications circuitry suitable for communicating with a server, edge computing systems and devices, a table or database server, or other networks or servers. The instructions for carrying out the above-mentioned functionality may be stored on a server (which is described in more detail in connection with FIG. 11). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as image processing application data described above. Nonvolatile memory may also be used (e.g., to launch a boot-up routine and other instructions). Cloud-based storage, described in relation to FIG. 10, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of user equipment 1000.

Control circuitry 1004 may also include digital-to-analog converter circuitry and analog-to-digital converter circuitry for converting between digital and analog signals. The tuning and encoding circuitry may be used by user equipment device 1000, 1001 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment device 1000, the tuning and encoding circuitry (including multiple tuners) may be associated with storage 1008.

Control circuitry 1004 may receive instruction from a user by way of user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of each one of user equipment device 1000 and user equipment device 1001. For example, display 1012 may be a touch-screen or touch-sensitive display. In such circumstances, user input interface 1010 may be integrated with or combined with display 1012. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1015.

Audio output equipment 1014 may be integrated with or combined with display 1012. Display 1012 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, SLM head mounted display, or any other suitable equipment for displaying visual images. A video card or graphics card may generate the output to the display 1012. Audio output equipment 1014 may be provided as integrated with other elements of each one of device 1000 and equipment 1001 or may be stand-alone units. An audio component of videos and other content displayed on display 1012 may be played through speakers (or headphones) of audio output equipment 1014. In some embodiments, audio may be distributed to a receiver (not shown), which processes and outputs the audio via speakers of audio output equipment 1014. In some embodiments, for example, control circuitry 1004 is configured to provide audio cues to a user, or other audio feedback to a user, using speakers of audio output equipment 1014. There may be a separate microphone 1016 or audio output equipment 1014 may include a microphone configured to receive audio input such as voice commands or speech. For example, a user may speak letters or words that are received by the microphone and converted to text by control circuitry 1004. In a further example, a user may voice commands that are received by a microphone and recognized by control circuitry 1004. Camera 1018 may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

The image processing application may be implemented using any suitable architecture. For example, it may be a stand-alone application wholly-implemented on each one of user equipment device 1000 and user equipment device 1001. In such an approach, instructions of the application may be stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to provide encoding/decoding functionality and preform any of the actions discussed herein. Based on the processed instructions, control circuitry 1004 may determine what action to perform when input is received from user input interface 1010. For example, movement of a cursor on a display up/down may be indicated by the processed instructions when user input interface 1010 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the image processing application is a client/server-based application. Data for use by a thick or thin client implemented on each one of user equipment device 1000 and user equipment device 1001 may be retrieved on-demand by issuing requests to a server remote to each one of user equipment device 1000 and user equipment device 1001. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on device 1000. This way, the processing of the instructions is performed remotely by the server while the resulting displays (e.g., that may include text, a keyboard, or other visuals) are provided locally on device 1000. Device 1000 may receive inputs from the user via input interface 1010 and transmit those inputs to the remote server for processing and generating the corresponding displays. For example, device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to device 1000 for presentation to the user.

In some embodiments, the image processing application may be downloaded and interpreted or otherwise run by an interpreter or virtual machine (run by control circuitry 1004). In some embodiments, the image processing application may be encoded in the ETV Binary Interchange Format (EBIF), received by control circuitry 1004 as part of a suitable feed, and interpreted by a user agent running on control circuitry 1004. For example, the image processing application may be an EBIF application. In some embodiments, the image processing application may be defined by a series of JAVA-based files that are received and run by a local virtual machine or other suitable middleware executed by control circuitry 1004. In some of such embodiments (e.g., those employing MPEG-2 or other digital media encoding schemes), image processing application may be, for example, encoded and transmitted in an MPEG-2 object carousel with the MPEG audio and video packets of a program.

FIG. 11 is a diagram of an illustrative system 1100 for encoding/decoding, in accordance with some embodiments of this disclosure. User equipment devices 1107, 1108, 1110 (e.g., which may correspond to one or more of computing device 1000 or 1001 may be coupled to communication network 1106). Communication network 1106 may be one or more networks including the Internet, a mobile phone network, mobile voice, or data network (e.g., a 5G, 4G, or LTE network), cable network, public switched telephone network, or other types of communication network or combinations of communication networks. Paths (e.g., depicted as arrows connecting the respective devices to the communication network 1106) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 11 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1106.

System 1100 may comprise media content source 1102, one or more servers 1104, and one or more edge computing devices 1116 (e.g., included as part of an edge computing system). In some embodiments, the image processing application may be executed at one or more of control circuitry 1111 of server 1104 (and/or control circuitry of user equipment devices 1107, 1108, 1110 and/or control circuitry 1118 of edge computing device 1116). In some embodiments, data structure sent in step 220 of FIG. 2, may be stored at database 1105 maintained at or otherwise associated with server 1104, and/or at storage 1122 and/or at storage of one or more of user equipment devices 1107, 1108, 1110.

In some embodiments, server 1104 may include control circuitry 1111 and storage 1114 (e.g., RAM, ROM, Hard Disk, Removable Disk, etc.). Storage 1114 may store one or more databases. Server 1104 may also include an input/output path 1112. I/O path 1112 may provide encoding/decoding data, device information, or other data, over a local area network (LAN) or wide area network (WAN), and/or other content and data to control circuitry 1111, which may include processing circuitry, and storage 1114. Control circuitry 1111 may be used to send and receive commands, requests, and other suitable data using I/O path 1112, which may comprise I/O circuitry. I/O path 1112 may connect control circuitry 1111 (and specifically control circuitry) to one or more communications paths. I/O path 1112 may comprise networking circuitry for sending data over network 1106 in any suitable format. For example, networking circuitry may comprises hardware such as a network card or network controller for sending and receiving packets of data over the Internet.

Control circuitry 1111 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 1111 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1111 executes instructions for an emulation system application stored in memory (e.g., the storage 1114). Memory may be an electronic storage device provided as storage 1114 that is part of control circuitry 1111.

Edge computing device 1116 may comprise control circuitry 1118, I/O path 1120 and storage 1122, which may be implemented in a similar manner as control circuitry 1111, I/O path 1112 and storage 1124, respectively of server 1104. Edge computing device 1116 may be configured to be in communication with one or more of user equipment devices 1107, 1108, 1110 and video server 1104 over communication network 1106, and may be configured to perform processing tasks (e.g., encoding/decoding) in connection with ongoing processing of video data. In some embodiments, a plurality of edge computing devices 1116 may be strategically located at various geographic locations, and may be mobile edge computing devices configured to provide processing support for mobile devices at various geographical regions.

Figure 12:
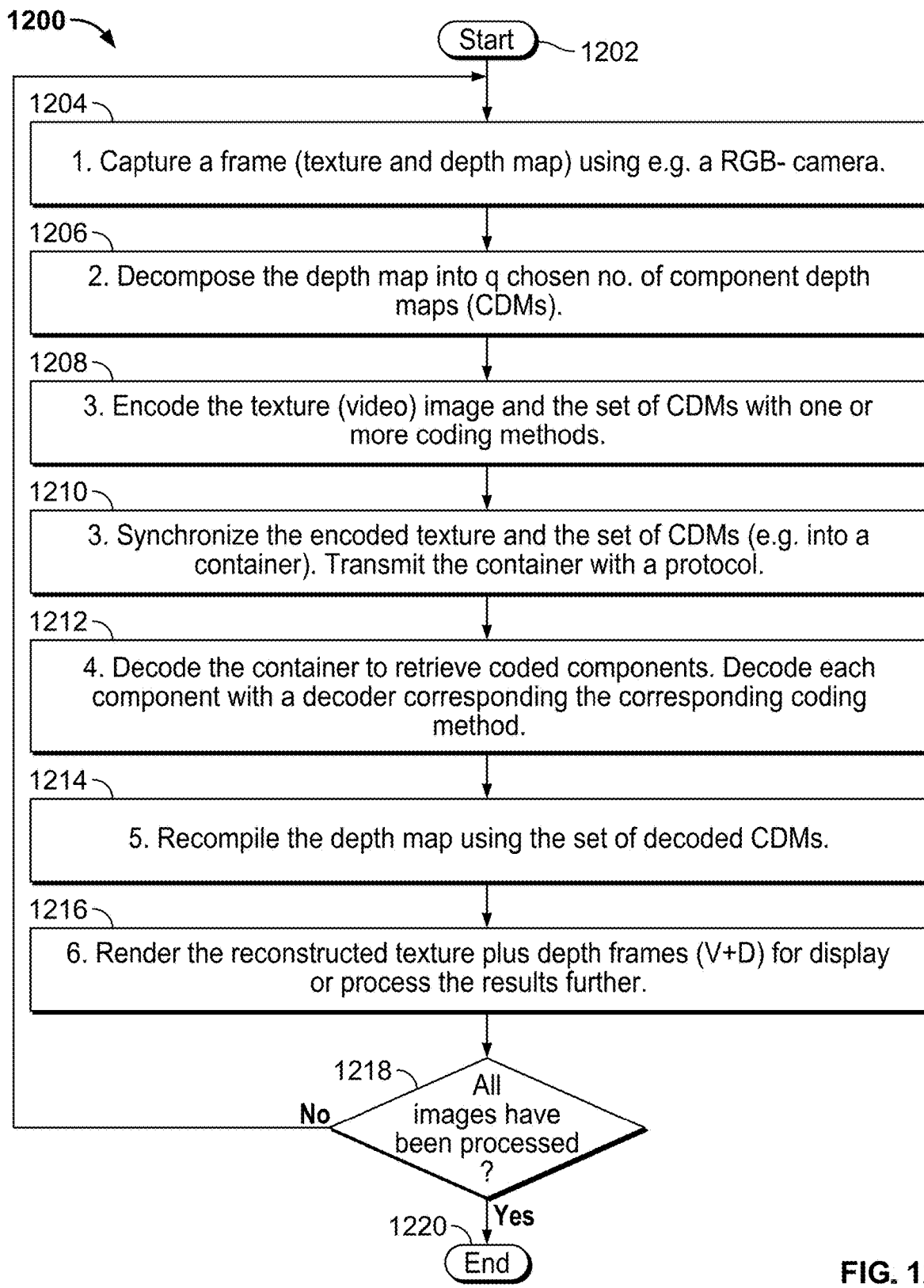
FIG. 12 is a flowchart of an illustrative process for transmitting an image, in accordance with some embodiments of this disclosure.

FIG. 12 is a flowchart of an illustrative process 1200 for transmitting an image, in accordance with some embodiments of this disclosure. In various embodiments, the individual steps of process 1200 may be implemented by one or more components of the devices and systems of FIGS. 2, 5, and 10-11. Although the present disclosure may describe certain steps of the process (and of other processes described herein) as being implemented by certain components of the devices and systems of FIGS. 2, 5, and 10-11, this is for purposes of illustration only, and it should be understood that other components of the devices and systems of FIGS. 2, 5, and 10-11 may implement those steps instead.

At step 1202, process 1200 begins (e.g., when a server 202 or 502 begins to encode 3D image data for transmission).

At step 1204, input/output circuitry (e.g., circuitry 1120 of FIG. 11) of a computing device (e.g., server 202 or 502) captures a frame (e.g., texture 114 and depth map 116) e.g., using an RGB-D camera.

At step 1206, the control circuitry (e.g., circuitry 1118 of FIG. 11) of the computing device decomposes the depth map into a chosen number of component depth maps (CDMs).

The number may be chosen based on desired quality of encoding. The decomposition may be performed as shown in element 106 of FIG. 1, for example using function shown in FIG. 3B.

At step 1208, the control circuitry encodes the texture (video) image and the set of CDMs with one or more coding methods, e.g., as described with respect to elements 214 and 218 of FIG. 2.

At step 1210, the control circuitry synchronizes the encoded texture and the set of CDMs (e.g., into a container). For example, synchronization may be performed as described in elements 214 and 218 of FIG. 2. The control circuitry transmits (e.g., using I/O circuitry 1120) the container with a selected protocol, e.g., over network 1106 of FIG. 11.

At step 1212, the control circuitry of a client device (e.g., device 204 of FIG. 2) decodes the container to retrieve decoded texture and decoded CDM components (e.g., as described in elements 222 and 224 of FIG. 2). The control circuitry decodes texture using a corresponding coding method. The control circuitry decodes each CDM component with a decoder using a corresponding coding method (if CDMs were coded using different coding parameters or standards).

At step 1214, the control circuitry of a client device recompiles the depth map using the set of decoded CDMs, e.g., using inverse function shown in FIG. 3D. At step 1216, the control circuitry renders the reconstructed texture plus depth frames (V+D) for display. In some embodiments, the control circuitry of a client device further processes the result.

At step 1218, the control circuitry checks if all images to be coded were processed, if not, the process returns to 1202 for next frame. If so, the process 1200 ends at 1220.

Figure 13:
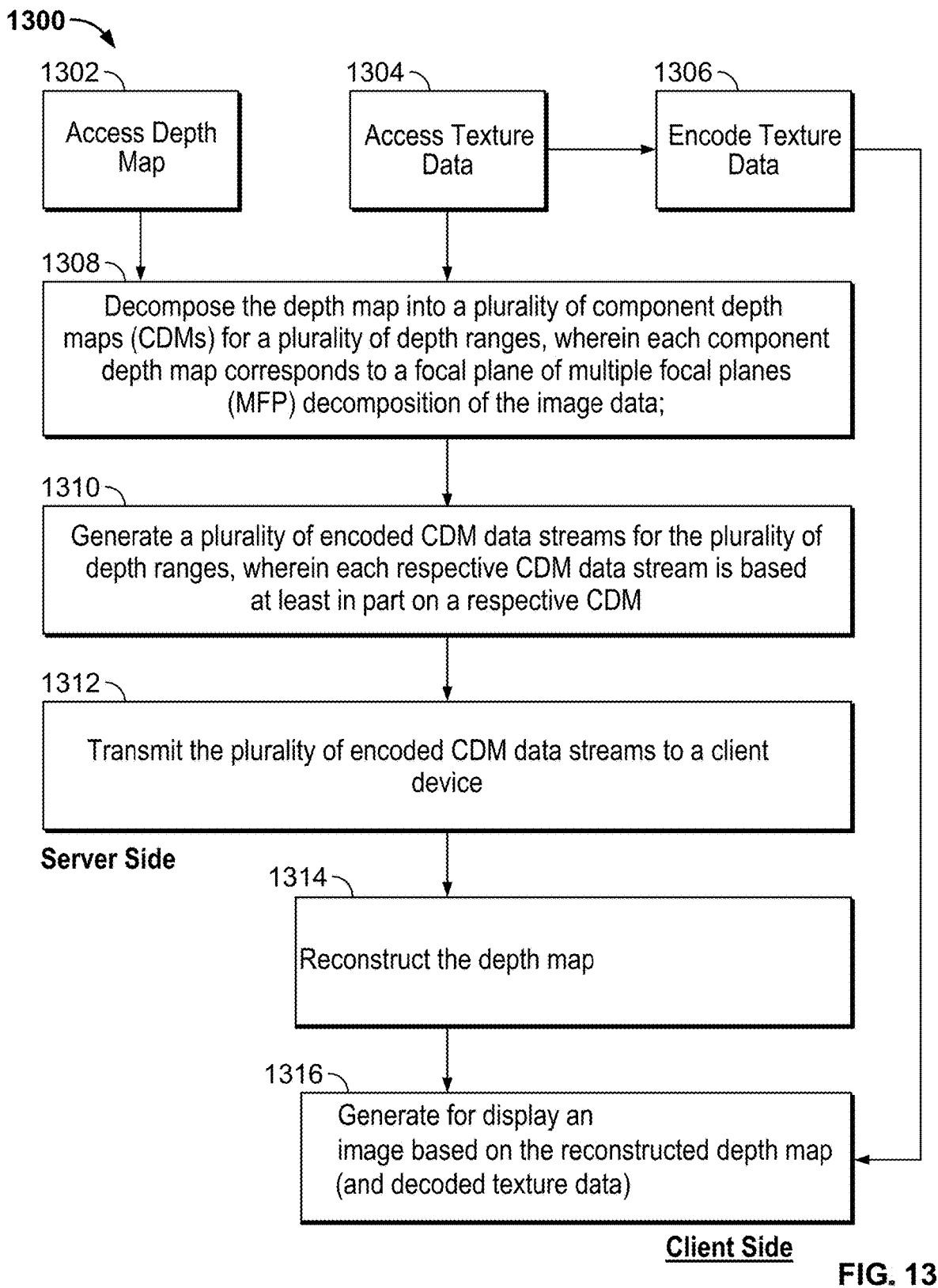
FIG. 13 is another flowchart of an illustrative process for transmitting an image, in accordance with some embodiments of this disclosure.

FIG. 13 is a flowchart of an illustrative process 1300 for rendering a 3D image, in accordance with some embodiments of this disclosure. In various embodiments, the individual steps of process 1300 may be implemented by one or more components of the devices and systems of FIGS. 2, 5, and 10-11. Although the present disclosure may describe certain steps of the process (and of other processes described herein) as being implemented by certain components of the devices and systems of FIGS. 2, 5, and 10-11, this is for purposes of illustration only, and it should be understood that other components of the devices and systems of FIGS. 2, 5, and 10-11 may implement those steps instead.

At step 1302, input/output circuitry (e.g., circuitry 1120 of FIG. 11) of a computing device (e.g., server 202 or 502) accesses depth map of an image (e.g., depth map 116). At step 1304, input/output circuitry (e.g., circuitry 1120 of FIG. 11) of a computing device (e.g., server 202 or 502) accesses texture map of an image (e.g., texture 114). Texture and depth may be accessed from local storage 1122, from remote source 1102, or from a camera 1018. Camera 1018 may be RGBD sensor or ToF sensor.

At step 1306, the control circuitry (e.g., circuitry 1118 of FIG. 11) of the computing device encodes the texture data for transmission to a client.

At step 1308, the control circuitry (e.g., circuitry 1118 of FIG. 11) of the computing device decomposes the depth map into a plurality of component depth maps (CDMs) for a plurality of depth ranges, wherein each component depth map corresponds to a focal plane of multiple focal planes (MFP) decomposition of the image data. In some embodiments, actual MFPs themselves may not be generated or stored.

At step 1310, the control circuitry generates a plurality of encoded CDM data streams for the plurality of depth ranges, wherein each respective CDM data stream is based at least in part on a respective CDM (e.g., CDMs may be coded as video stream based on multiple CDMs of frames of a video).

At step 1312, the input/output circuitry of the computing device transmits the plurality of encoded CDM data streams to a client device, e.g., over network 1106

At step 1314, control circuitry of a client device reconstructs the depth map (e.g., using formula of FIG. 3D).

At step 1316, control circuitry of the client device generates for display or for further processing an image based on the reconstructed depth map (and decoded texture data) that may have been received via parallel streaming.

Figure 14:
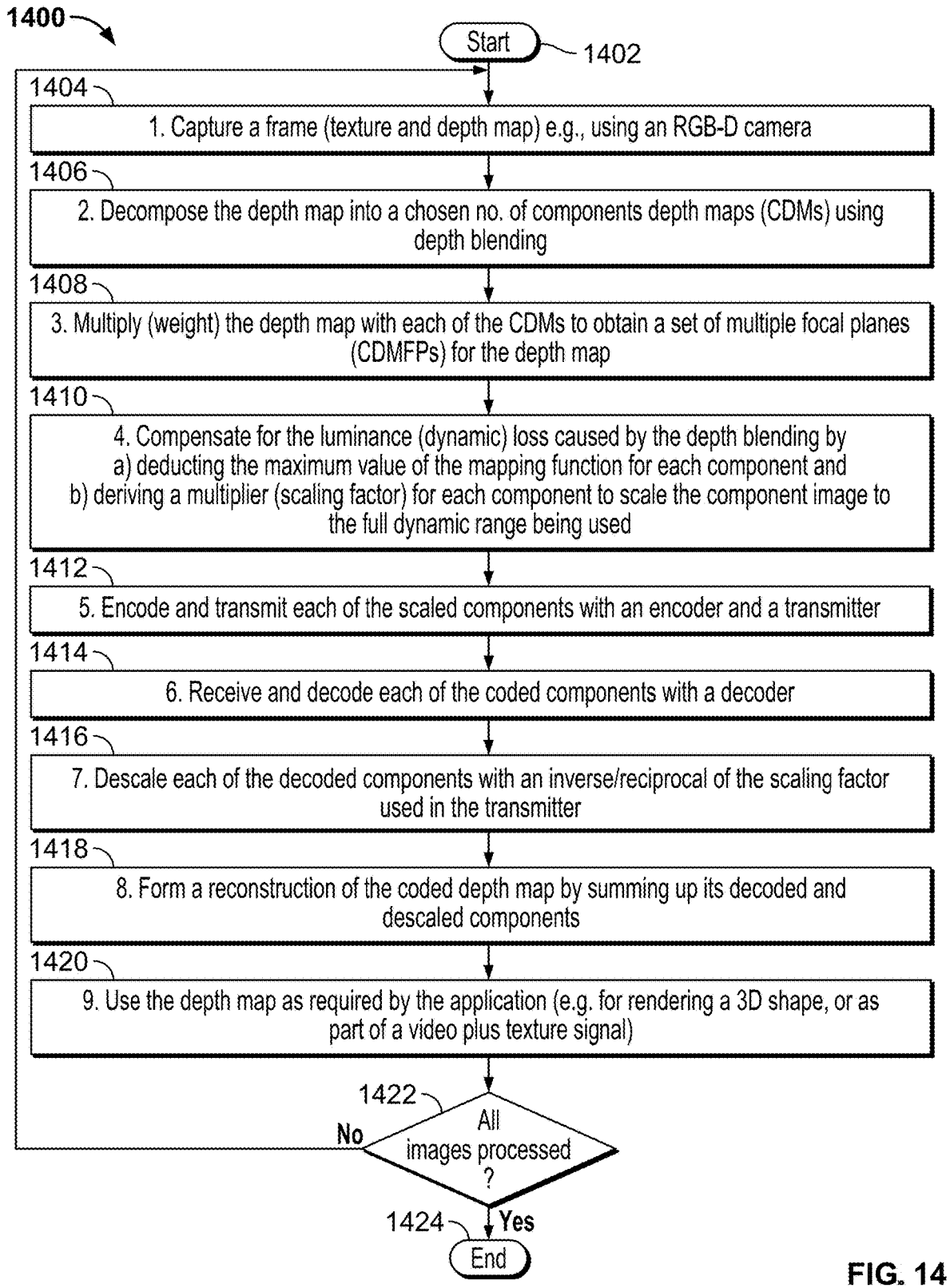
FIG. 14 is another flowchart of an illustrative process for transmitting an image, in accordance with some embodiments of this disclosure.

FIG. 14 is a flowchart of an illustrative process 1400 for transmitting an image, in accordance with some embodiments of this disclosure. In various embodiments, the individual steps of process 1400 may be implemented by one or more components of the devices and systems of FIGS. 2, 5, and 10-11. Although the present disclosure may describe certain steps of the process (and of other processes described herein) as being implemented by certain components of the devices and systems of FIGS. 2, 5, and 10-11, this is for purposes of illustration only, and it should be understood that other components of the devices and systems of FIGS. 2, 5, and 10-11 may implement those steps instead.

At step 1402, process 1400 begins (e.g., when a server 202 or 502 begins to encode 3D image data for transmission).

At step 1404, input/output circuitry (e.g., circuitry 1120 of FIG. 11) of a computing device (e.g., server 202 or 502) captures a frame (e.g., texture 114 and depth map 116) e.g., using an RGB-D camera.

At step 1406, the control circuitry (e.g., circuitry 1118 of FIG. 11) of the computing device decomposes the depth map into a chosen number of component depth maps (CDMs). The number may be chosen based on desired quality of encoding. The decomposition may be performed as shown in element 106 of FIG. 1, for example using function shown in FIG. 3B.

At step 1408, the control circuitry generates CDMFPs, e.g., by multiplying, weighing, or scaling the depth map with each of the CDMs to obtain a set of multiple focal planes (CDMFPs) for the depth map.

At step 1410, the control circuitry may compensate for the luminance (dynamic) loss caused by the depth blending by a) deducting the maximum value of the mapping function for each component, and b) deriving a multiplier (scaling factor) for each component to scale the component image to the full dynamic range being used. As a result, the control circuitry generates SCDMFPs (e.g., as explained in element 112 of FIG. 1). In some other embodiments, SCDMFPs may be generated directly using scaled functions (e.g., as shown in FIG. 7B).

At step 1412, the control circuitry encodes the set of SCDMFPs with one or more coding methods, e.g., as described with respect to element 518 of FIG. 5. The control circuitry transmits (e.g., using I/O circuitry 1120) each of the encoded scaled components, e.g., over network 1106. The control circuitry may synchronize the encoded texture and the set of SCDMFPs (e.g., into a container). For example, synchronization may be performed as described in elements 514 and 518 of FIG. 5. The control circuitry transmits (e.g., using I/O circuitry 1120) the container with a selected protocol, e.g., over network 1106.

At step 1414, the control circuitry of a client device (e.g., device 504 of FIG. 5) decodes the encoded scaled components to retrieve decoded SCDMFPs components (e.g., as described in element 524 of FIG. 5). The control circuitry decodes each SCDMFPs component with a decoder corresponding the corresponding coding method (if SCDMFPs were coded using different coding parameters or standards).

At step 1416, the control circuitry of a client device descales each of the decoded components with an inverse/reciprocal of the scaling factor used in the transmitter (which may have been transmitted along with coded SCDMFPs).

At step 1418, the control circuitry of a client device recompiles the depth map using the set of decoded SCDMFPs, e.g., by summing the CDMFPs (i.e., descaled SCDMFPs).

At step 1420, the control circuitry of a client device uses the depth map as required by the application (e.g., for rendering a 3D shape, or as part of a video plus texture signal).

At 1422, the control circuitry checks if all images to be coded were processed, if not, the process returns to 1402 for a next frame. If so, the process 1400 ends at step 1424.

Figure 15:
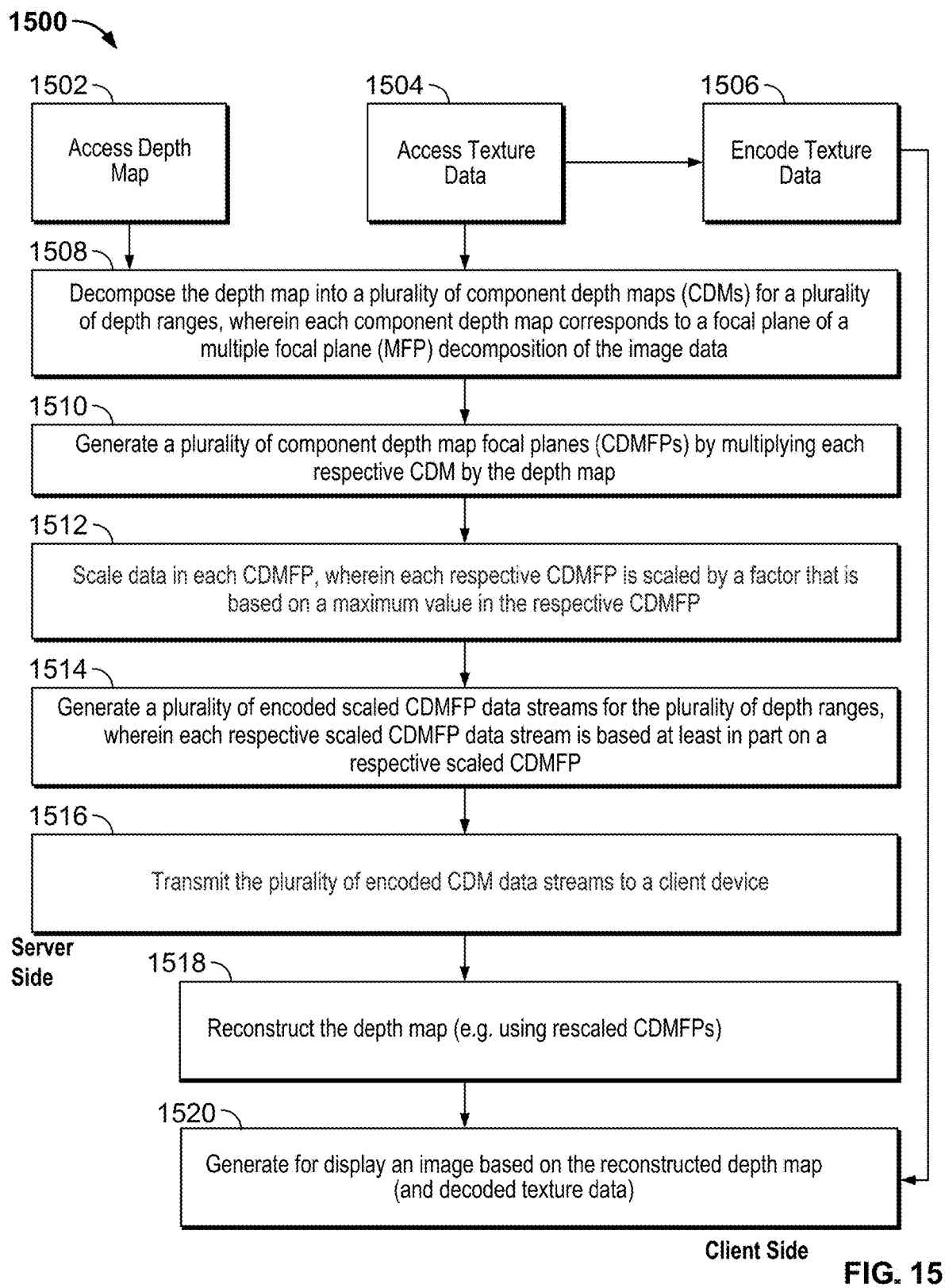
FIG. 15 is yet another flowchart of an illustrative process for transmitting an image, in accordance with some embodiments of this disclosure.

FIG. 15 is a flowchart of an illustrative process 1500 for transmitting an image, in accordance with some embodiments of this disclosure. In various embodiments, the individual steps of process 1500 may be implemented by one or more components of the devices and systems of FIGS. 2, 5, and 10-11. Although the present disclosure may describe certain steps of the process (and of other processes described herein) as being implemented by certain components of the devices and systems of FIGS. 2, 5, and 10-11, this is for purposes of illustration only, and it should be understood that other components of the devices and systems of FIGS. 2, 5, and 10-11 may implement those steps instead.

At step 1502, input/output circuitry (e.g., circuitry 1120 of FIG. 11) of a computing device (e.g., server 202 or 502) access depth map of an image (e.g., depth map 116). At step 1504, input/output circuitry (e.g., circuitry 1120 of FIG. 11) of a computing device (e.g., server 202 or 502) access texture map of an image (e.g., texture 114). Texture and depth may be accessed from local storage 1122, from remote source 1102, or from a camera 1018.

At step 1506, the control circuitry (e.g., circuitry 1118 of FIG. 11) of the computing device encodes the texture data for transmission to a client.

At step 1508, the control circuitry (e.g., circuitry 1118 of FIG. 11) of the computing device decomposes the depth map into a plurality of component depth maps (CDMs) for a plurality of depth ranges, wherein each component depth map corresponds to a focal plane of multiple focal planes (MFP) decomposition of the image data. In some embodiments, actual MFPs themselves may not be generated or stored.

At step 1510, the control circuitry generates a plurality of component depth map focal planes (CDMFPs) by multiplying each respective CDM by the depth map (e.g., as explained in step 110).

At step 1512, the control circuitry scales data in each CDMFP, wherein each respective CDMFP is scaled by a factor that is based on a value in the respective CDMFP (e.g., maximum value, value close to maximum, or another suitable scaling factor). Scaling is described in more detail in element 517 of FIG. 5. Alternatively, scaled CDMFPs (SCDMFPs) may be created using scaled blending function (e.g., as shown in FIG. 7B).

At step 1514, the control circuitry generates a plurality of encoded SCDMFPs data streams for the plurality of depth ranges, wherein each respective SCDMFPs data stream is based at least in part on a respective SCDMFPs (e.g., SCDMFPs may be coded as video stream based on multiple SCDMFPs of frames of a video).

At step 1516, the I/O circuitry transmits the plurality of encoded SCDMFPs data streams to a client device, e.g., over network 1106.

At step 1518, control circuitry of a client device reconstructs the depth map. For example, the circuitry of a client device may de-scale the SCDMFPs and add up the resulting CDMFPs.

At step 1520, control circuitry of the client device generates for display, storage, and/or for further processing an image based on the reconstructed depth map (and decoded texture data) that may have been received via parallel streaming.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
accessing image data that comprises a texture data and a depth map;
decomposing the depth map into a plurality of component depth maps (CDMs) for a plurality of depth ranges, wherein each component depth map corresponds to a focal plane of a multiple focal plane (MFP) decomposition of the image data;
generating a plurality of component depth map focal planes (CDMFPs) by combining each respective CDM with the depth map;
scaling data in each CDMFP, wherein each respective CDMFP is scaled by a respective scaling factor;
generating a plurality of encoded scaled CDMFP data streams for the plurality of depth ranges, wherein each respective scaled CDMFP data stream is based at least in part on a respective scaled CDMFP; and
transmitting the plurality of encoded scaled CDMFP data streams to a client device to cause the client device to:
reconstruct the depth map based on a plurality of decoded scaled CDMFPs; and
generate for display an image based on the reconstructed depth map.

2. The method of claim 1, wherein the combining each respective CDM with the depth map comprises multiplying each respective CDM by the depth map.

3. The method of claim 1, wherein each respective scaling factor is based on a maximum value in the respective CDMFP.

4. The method of claim 1, wherein the plurality of encoded scaled CDMFP data streams are transmitted in parallel as part of a data container.

5. The method of claim 4, wherein:
the plurality of encoded scaled CDMFP data streams are synchronized with the texture data; and
the transmitting the plurality of encoded CDM data streams to a client device comprises transmitting the plurality of encoded CDMFP data streams synchronized with the texture data to cause the client device to generate for display an image based on the reconstructed depth map and the synchronized texture data received as part of a data container.

6. The method of claim 1, wherein:
decomposing the depth map into a plurality of CDMs comprises applying a decomposition function to the depth map; and
the client is causes to reconstructing the depth map by summing de-scaled scaled CDMFPs.

7. The method of claim 6, wherein the decomposition function is a set of tent functions.

8. The method of claim 6, wherein the decomposition function is a set of sinusoid functions.

9. The method of claim 1, further comprising:
identifying a key depth range by performing object detection on the image data;
selecting a key CDMFP of the plurality of CDMFPs that corresponds to the key depth range;
wherein the generating the plurality of encoded scaled CDMFP data streams comprises:
encoding the key CDMFP at higher bit rate than at least one other CDMFP of the plurality of CDMFPs.

10. The method of claim 9, wherein the selection of the key CDMFP is performed during live streaming of the image data.

11. The method of claim 1, wherein generating the plurality of encoded CDMFP data streams comprises:
separately pre-encoding each CDMFP at a plurality of bit rates.

12. The method of claim 11, wherein transmitting the plurality of encoded CDMFP data streams comprises:
selecting a first bit rate of the plurality of bit rates for a first CDMFP of the plurality of CDMFPs; and
selecting a second bit rate of the plurality of bit rates for a second CDMFP of the plurality of CDMFPs;
transmitting data pre-encoded at the first bit rate for the first CDMFP; and
transmitting data pre-encoded at the second bit rate for the second CDMFP.

13. A system comprising:
control circuitry configured to:
access image data that comprises a texture data and a depth map;
decompose the depth map into a plurality of component depth maps (CDMs) for a plurality of depth ranges, wherein each component depth map corresponds to a focal plane of a multiple focal plane (MFP) decomposition of the image data;
generate a plurality of component depth map focal planes (CDMFPs) by combining each respective CDM with the depth map;
scaling data in each CDMFP, wherein each respective CDMFP is scaled by a respective scaling factor;
generate a plurality of encoded scaled CDMFP data streams for the plurality of depth ranges, wherein each respective scaled CDMFP data stream is based at least in part on a respective scaled CDMFP; and
networking circuitry configured to:
transmit the plurality of encoded scaled CDMFP data streams to a client device to cause the client device to:
reconstruct the depth map based on a plurality of decoded scaled CDMFPs; and
generate for display an image based on the reconstructed depth map.

14. The system of claim 13, wherein the control circuitry configured to combine each respective CDM with the depth map by multiplying each respective CDM by the depth map.

15. The system of claim 13, wherein each respective scaling factor is based on a maximum value in the respective CDMFP.

16. The system of claim 13, wherein the networking circuitry configured to transmit the plurality of encoded scaled CDMFP data streams in parallel as part of a data container.

17. The system of claim 16, wherein:
the control circuitry is configured to synchronize the plurality of encoded scaled CDMFP data streams with the texture data; and
the networking circuitry is configured to transmit the plurality of encoded CDM data streams to a client device by transmitting the plurality of encoded CDMFP data streams synchronized with the texture data to cause the client device to generate for display an image based on the reconstructed depth map and the synchronized texture data received as part of a data container.

18. The system of claim 13, wherein:
the control circuitry is configured to decompose the depth map into a plurality of CDMs by applying a decomposition function to the depth map; and
the client is caused to reconstructing the depth map by summing de-scaled scaled CDMFPs.

19. The system of claim 18, wherein the decomposition function is a set of tent functions.

20. The system of claim 18, wherein the decomposition function is a set of sinusoid functions.

* * * * *